(12) United States Patent
Bovik et al.

(10) Patent No.: US 12,058,340 B2
(45) Date of Patent: Aug. 6, 2024

(54) VIDEO COMPRESSION TECHNIQUE USING A MACHINE LEARNING SYSTEM

(71) Applicant: Board of Regents, The University of Texas System, Austin, TX (US)

(72) Inventors: Alan Bovik, Austin, TX (US); Sungsoo Kim, Austin, TX (US); Jin Soo Park, Austin, TX (US); Christos G. Bampis, Austin, TX (US); Georgios Alex Dimakis, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 17/840,126

(22) Filed: Jun. 14, 2022

(65) Prior Publication Data

US 2022/0312017 A1    Sep. 29, 2022

Related U.S. Application Data

(62) Division of application No. 17/102,743, filed on Nov. 24, 2020, now Pat. No. 11,388,412.

(Continued)

(51) Int. Cl.
*H04N 19/14*    (2014.01)
*G06N 3/045*    (2023.01)
(Continued)

(52) U.S. Cl.
CPC ............ *H04N 19/14* (2014.11); *G06N 3/045* (2023.01); *G06N 3/08* (2013.01); *H04N 19/119* (2014.11);
(Continued)

(58) Field of Classification Search
CPC .... H04N 19/14; H04N 19/119; H04N 19/124; H04N 19/172; H04N 19/30; H04N 19/42;
(Continued)

(56) References Cited

U.S. PATENT DOCUMENTS

2003/0108248 A1    6/2003  Huang et al.
2004/0066981 A1    4/2004  Li et al.
(Continued)

OTHER PUBLICATIONS

Beuran et al., "Network Quality of Service Measurement System for Application Requirements Evaluation," Spects'03, 2003, pp. 380-387.
(Continued)

*Primary Examiner* — Tracy Y. Li
(74) *Attorney, Agent, or Firm* — Robert A. Voigt, Jr.; Shackelford, McKinley & Norton, LLP

(57) ABSTRACT

A computer-implemented method, system and computer program product for compressing video. A set of video frames is partitioned into two subsets of different types of frames, a first type and a second type. The first type of frames of videos is compressed to generate a first representation by a first stage encoder. The first representation is then decoded to reconstruct the first type of frames using a first stage decoder. The second type of frames of video is compressed to generate a second representation that only contains soft edge information by a second stage encoder. A generative model corresponding to a second stage decoder is then trained using the first representation and the reconstructed first type of frames by using a discriminator employed by a machine learning system. After training the generative model, it generates reconstructed first and second types of frames using the soft edge information.

20 Claims, 29 Drawing Sheets

Related U.S. Application Data

(60) Provisional application No. 62/940,389, filed on Nov. 26, 2019.

(51) Int. Cl.
*G06N 3/08* (2023.01)
*H04N 19/119* (2014.01)
*H04N 19/124* (2014.01)
*H04N 19/172* (2014.01)
*H04N 19/30* (2014.01)
*H04N 19/42* (2014.01)
*H04N 19/85* (2014.01)

(52) U.S. Cl.
CPC ......... *H04N 19/124* (2014.11); *H04N 19/172* (2014.11); *H04N 19/30* (2014.11); *H04N 19/42* (2014.11); *H04N 19/85* (2014.11)

(58) Field of Classification Search
CPC ...... H04N 19/85; H04N 19/187; G06N 3/045; G06N 3/08
See application file for complete search history.

(56) References Cited

U.S. PATENT DOCUMENTS

| | | |
|---|---|---|
| 2008/0055124 A1 | 3/2008 | Lakus-Becker |
| 2008/0226185 A1 | 9/2008 | Henry |
| 2009/0034874 A1 | 2/2009 | Miller |
| 2011/0243470 A1 | 10/2011 | Noguchi |
| 2014/0122962 A1 | 5/2014 | Kodavalla |
| 2015/0281709 A1* | 10/2015 | Bracha ................... H04N 19/65 |
| | | 375/240.26 |
| 2015/0288979 A1 | 10/2015 | Dong |
| 2018/0174052 A1 | 6/2018 | Rippel et al. |
| 2020/0059669 A1 | 2/2020 | Nishi et al. |
| 2020/0374553 A1* | 11/2020 | Ma ......................... H04N 19/59 |
| 2021/0224957 A1* | 7/2021 | Iwase ..................... G06T 5/002 |
| 2021/0233214 A1* | 7/2021 | Liu ......................... G06T 5/003 |

OTHER PUBLICATIONS

Kim et al., "Adversarial Video Compression Guided by Soft Edge Detection," arXiv:1811.10673 [eess.IV], Nov. 26, 2018, pp. 1-10.
Rippel et al., "Learned Video Compression," arXiv:1811.06981v1 [eess.IV], Nov. 16, 2018, pp. 1-11.
Wu et al., "Video Compression Through Image Interpolation," arXiv:1804.06919v1 [cs.CV], Apr. 18, 2018, pp. 1-18.

* cited by examiner

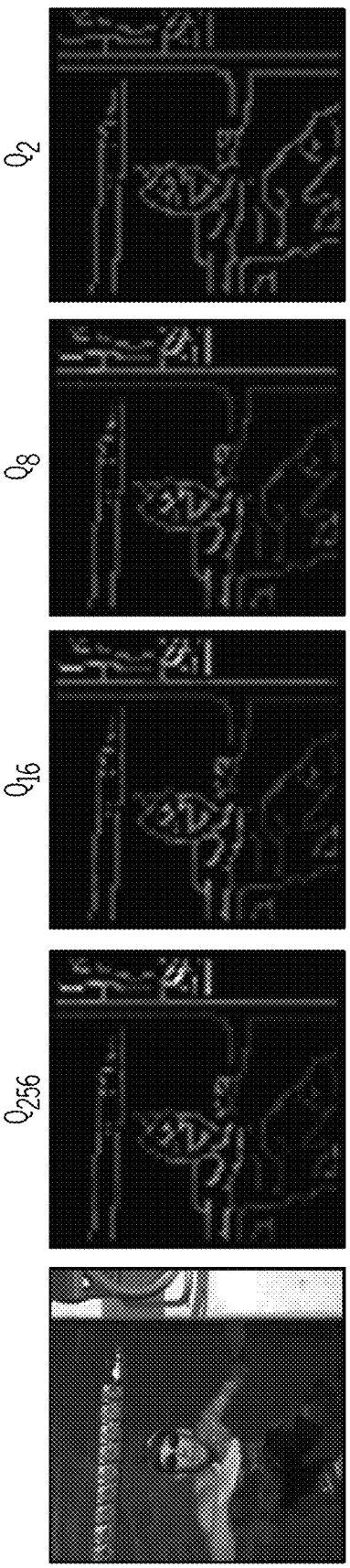
FIG. 6A1  FIG. 6A2  FIG. 6A3  FIG. 6A4  FIG. 6A5

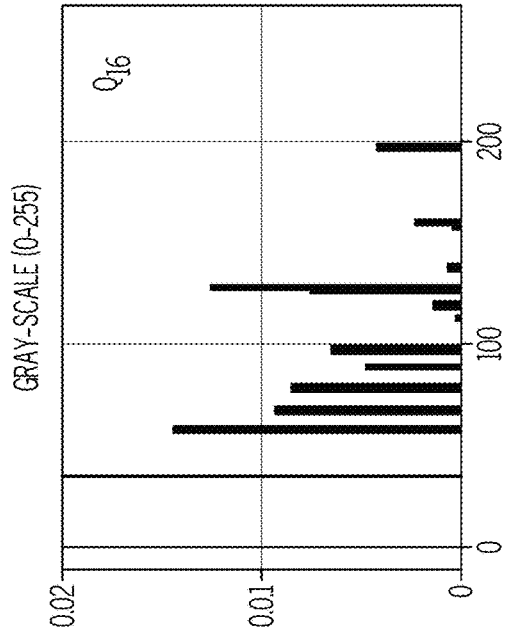
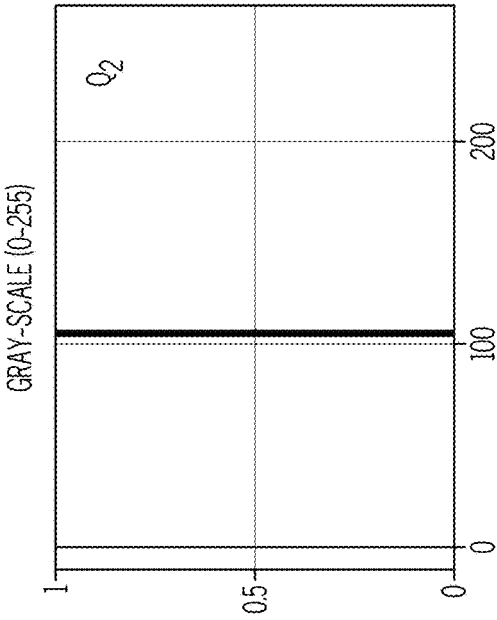
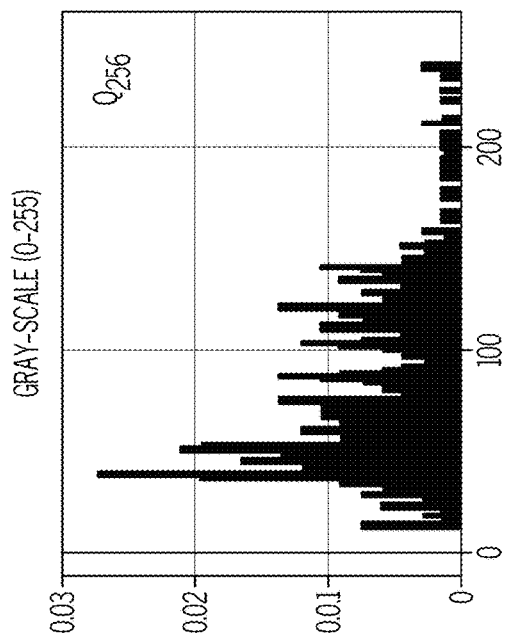
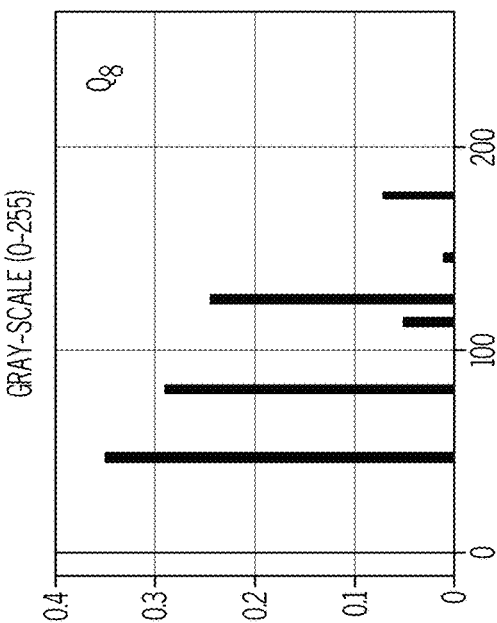

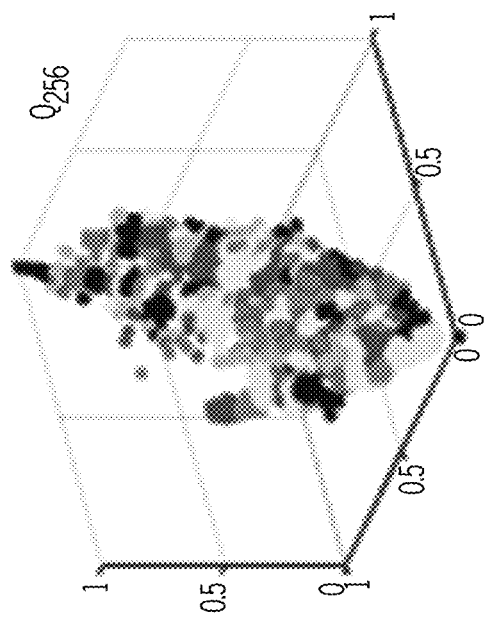
FIG. 6C1
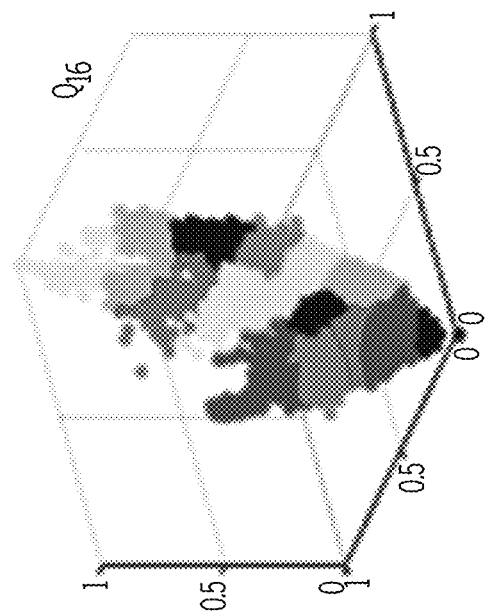
FIG. 6C2
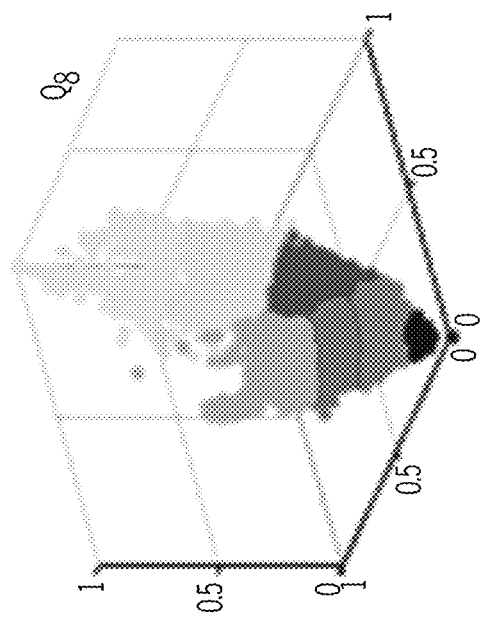
FIG. 6C3
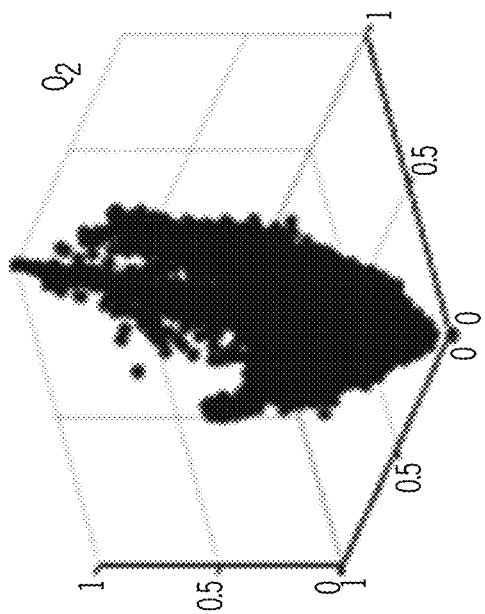
FIG. 6C4

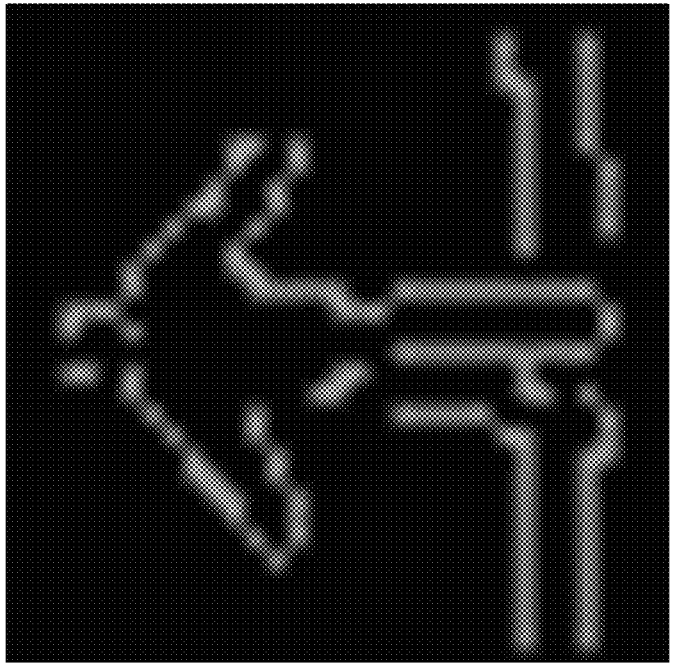
FIG. 7A
$x_{I_1}$ and $x'_{I_1}$
$x'_{I_1}$ is located at the right-lower corner
FIG. 7B
$x'_{I_1}$
(magnified for visualization)
| Original 256×256 | PNG 32×32 | JBIG 32×32 | Proposed 32×32 |
|---|---|---|---|
| 8 | 0.0405 | 0.0109 | 0.0022 |
Table entries show bit per pixel (BPP) of the compressed lossless algorithms
FIG. 7C

|  | PSNR | SSIM | MS-SSIM |
|---|---|---|---|
| 32 X 32 | 26.4095 | 0.8540 | 0.9164 |
| 64 X 64 | 28.4613 | 0.8879 | 0.9476 |
| 256 X 256 | 30.6369 | 0.9128 | 0.9658 |

FIG. 9

|       | PSNR   | SSIM   | MS-SSIM |
|-------|--------|--------|---------|
| $Q_2$ | 12.212 | 0.3095 | 0.3247  |
| $Q_4$ | 16.868 | 0.5017 | 0.7202  |
| $Q_8$ | 16.947 | 0.5327 | 0.7548  |

FIG. 11

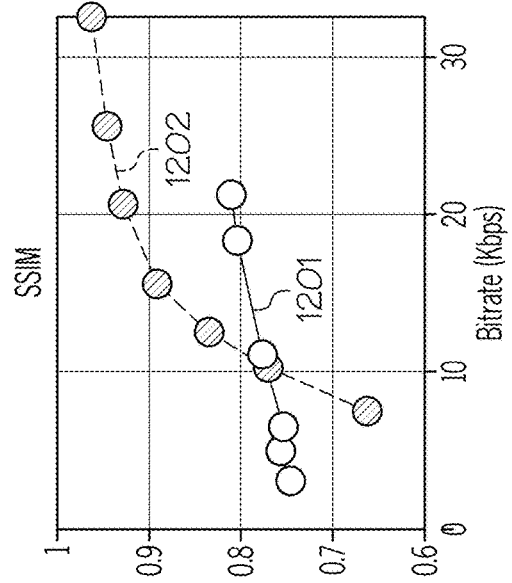
FIG. 12B1
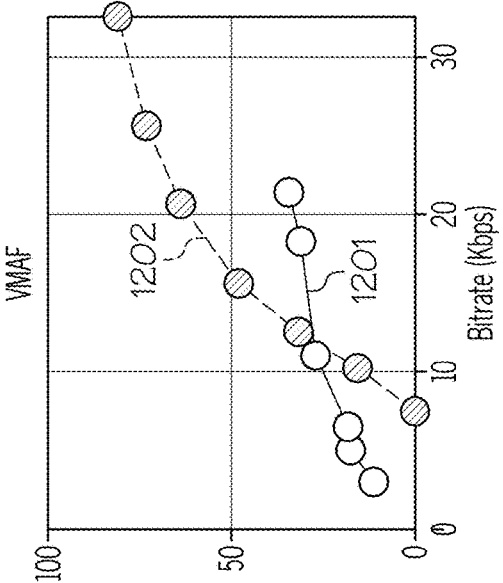
FIG. 12B2
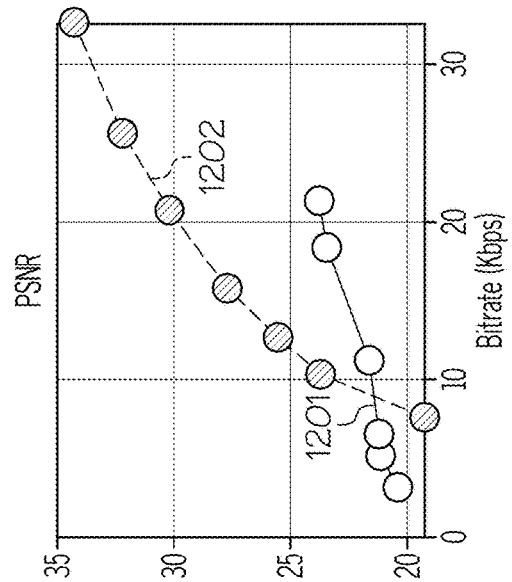
FIG. 12B3
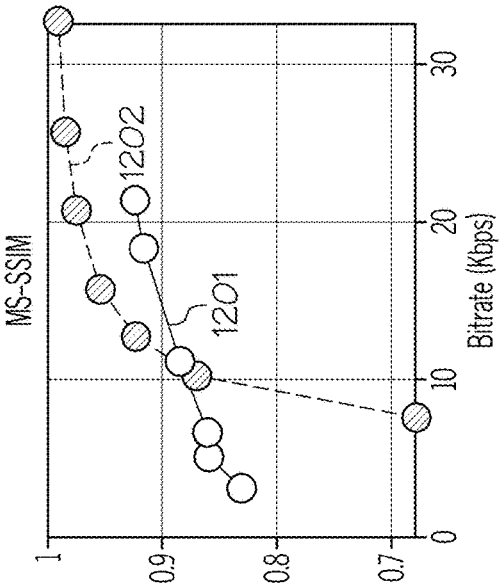
FIG. 12B4

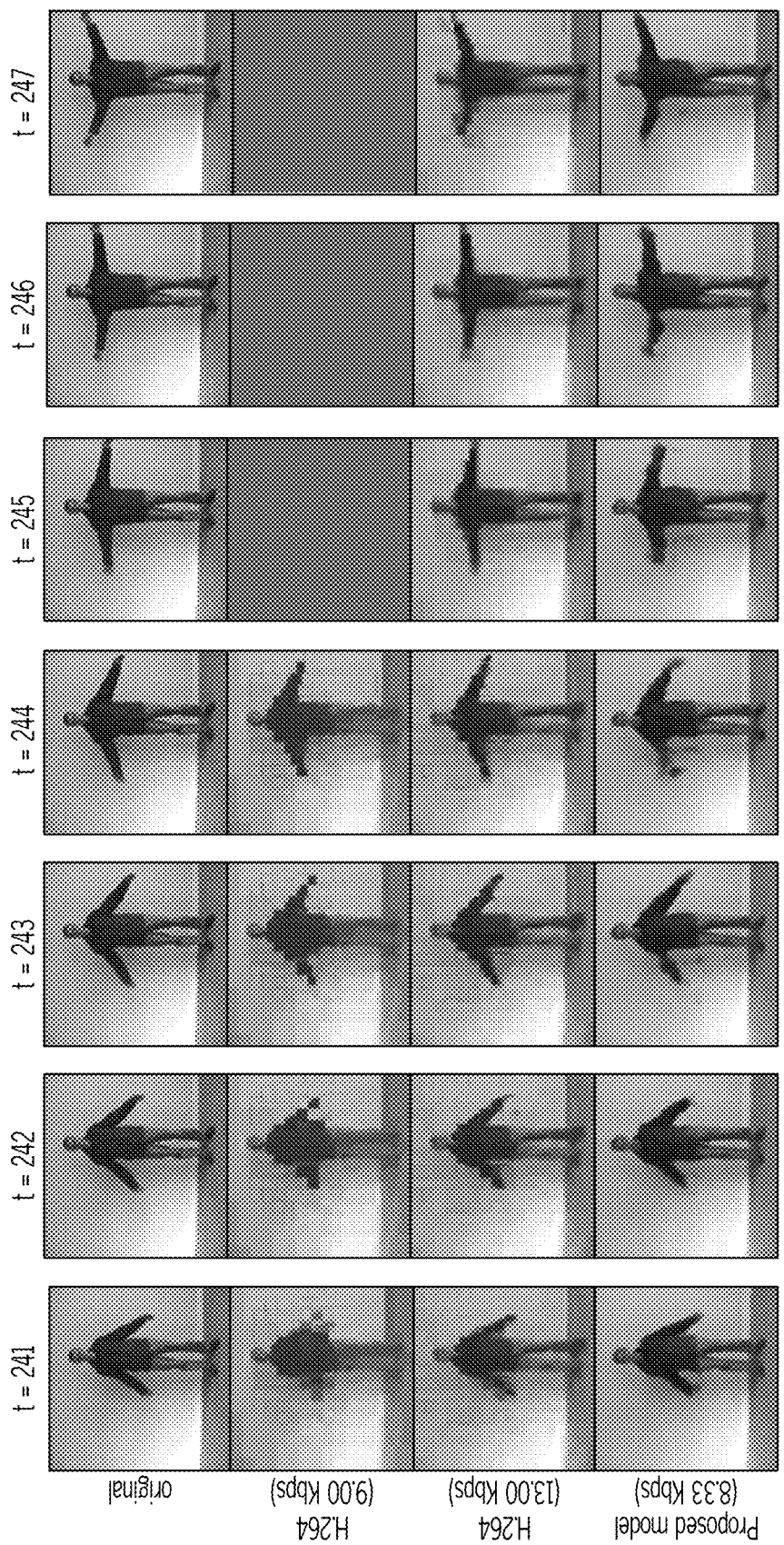
FIG. 14A1

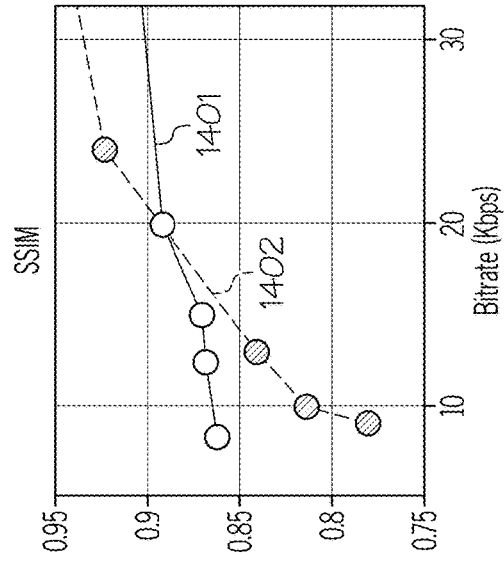
FIG. 14A2a
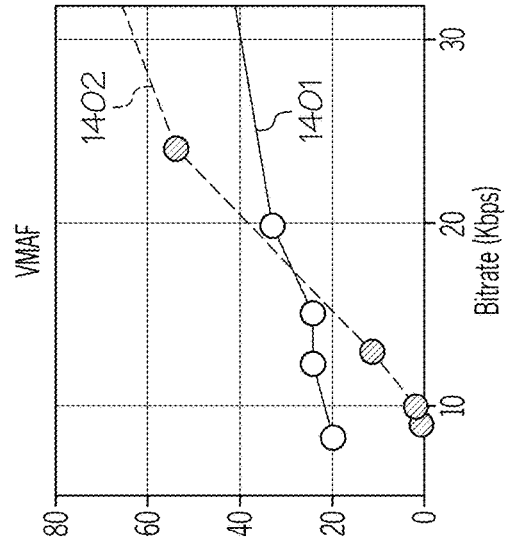
FIG. 14A2b
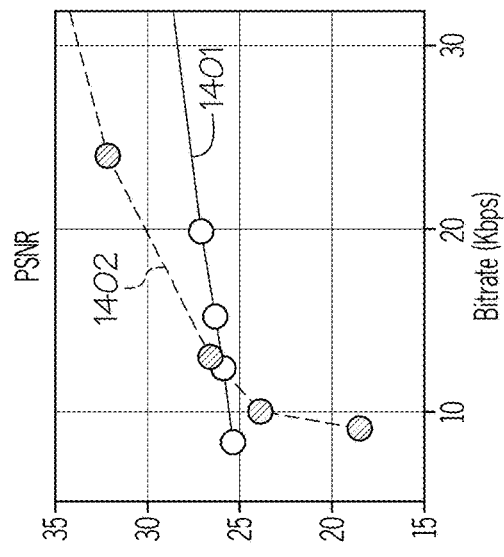
FIG. 14A2c
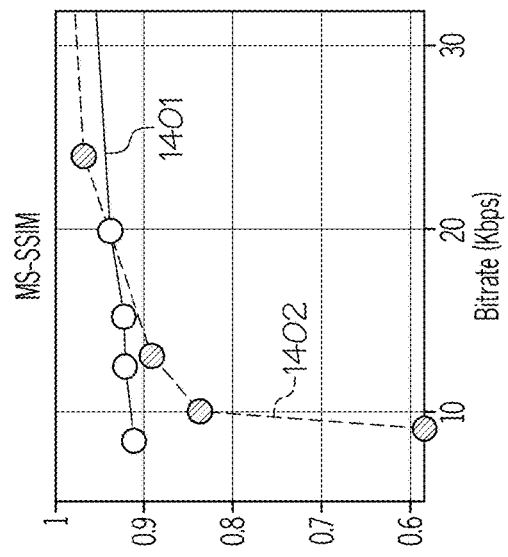
FIG. 14A2d

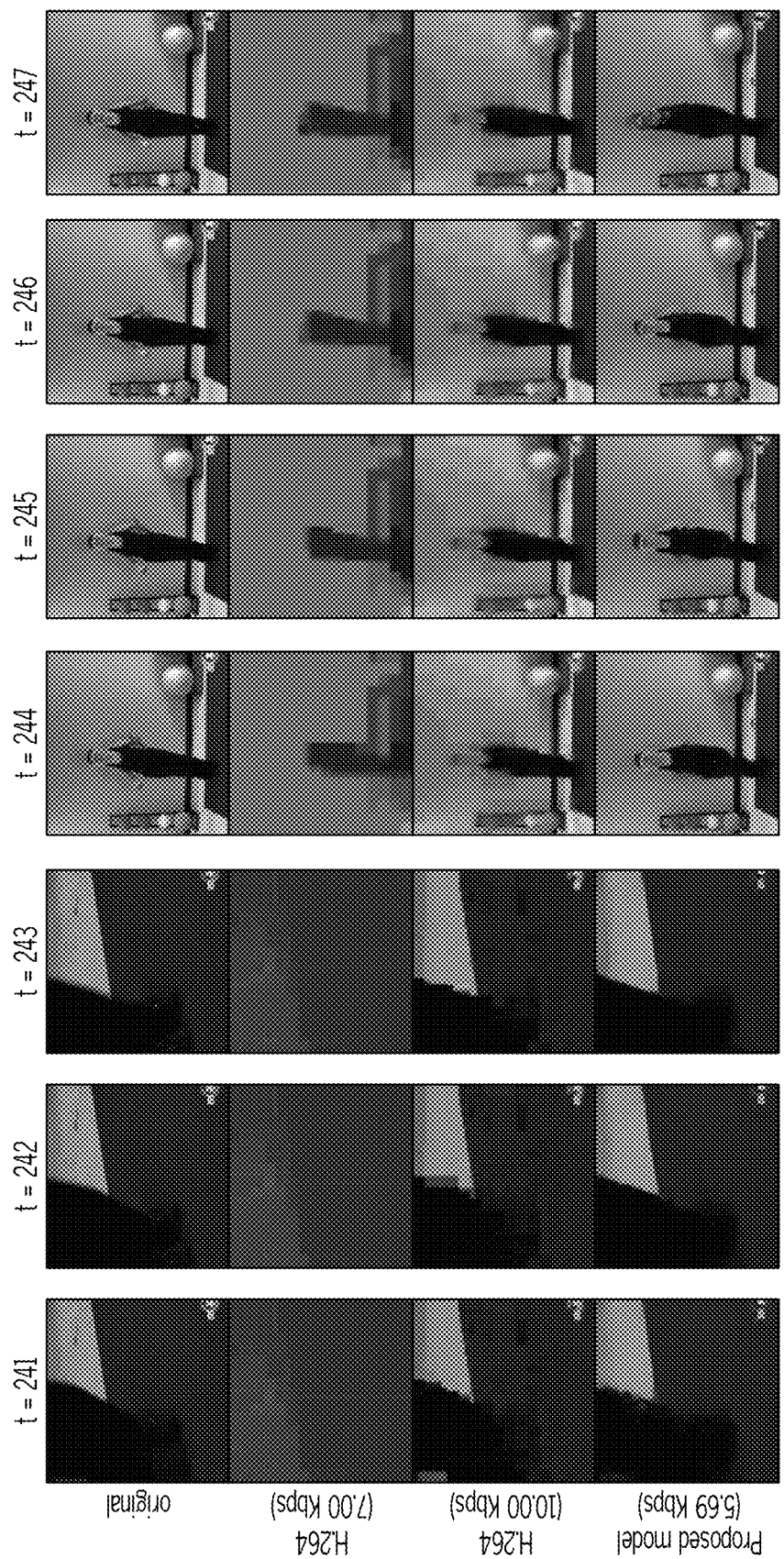
FIG. 14B1

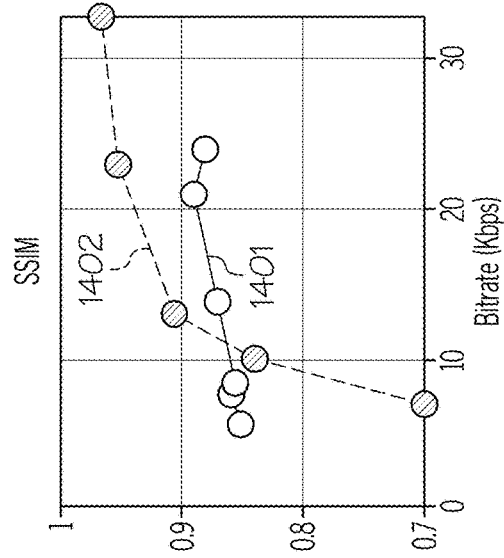
FIG. 14B2a
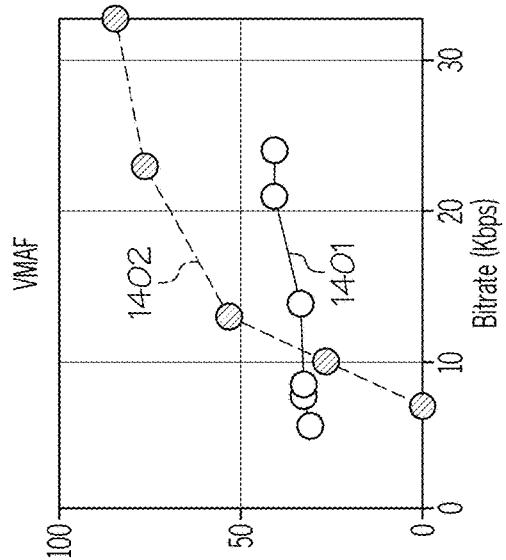
FIG. 14B2b
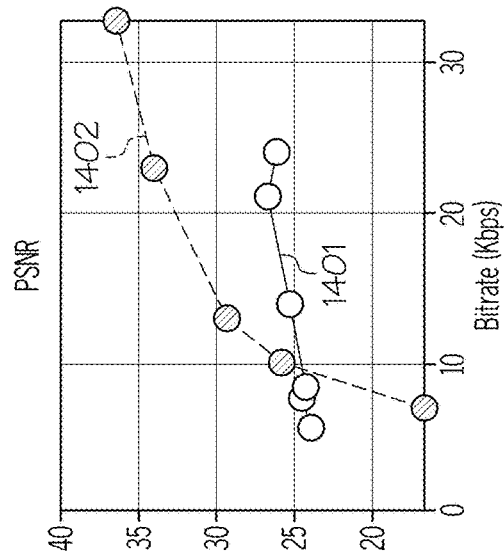
FIG. 14B2c
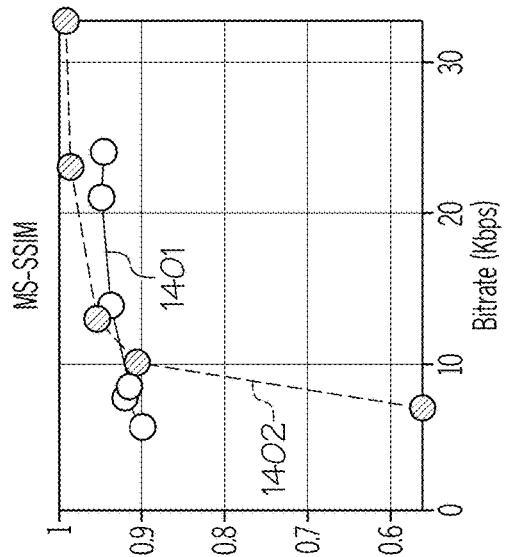
FIG. 14B2d

VIDEO COMPRESSION TECHNIQUE USING A MACHINE LEARNING SYSTEM

TECHNICAL FIELD

The present invention relates generally to video compression, and more particularly to a video compression technique using a machine learning system (e.g., generative adversarial network).

BACKGROUND

Video compression is a process of reducing the size of an image or video file by exploiting spatial and temporal redundancies within an image or video frame and across multiple video frames. The ultimate goal of a successful video compression system is to reduce data volume while retaining the perceptual quality of the decompressed data. Standard video compression techniques, such as H.264, HEVC, VP9 and others, have aimed for decades to push the limits of these "rate-distortion" tradeoffs. Developing better video compression techniques lies at the core of applications where more efficient video storage and transmission are essential, such as video streaming.

Despite the success of traditional video compression standards, there has recently been heightened interest in the possibility of neural network based image and video compression, fueled by the success of deep neural networks (DNNs) in image-related applications. DNNs have been successfully applied to image compression and shown to deliver promising performance, especially at low bitrates. Similar ideas have been applied to video compression, e.g., by casting the motion estimation task as an interpolation solved by training on a large volume of videos. These approaches have achieved performance approaching that of prevailing standardized codecs, such as H.264 and HEVC.

However, deep neural networks (DNNs)-based codecs require a large volume of training video for casting the motion estimation task as an interpolation. In addition, such techniques require a reference frame to reconstruct a target frame through interpolation. The reference frame is selected under close temporal proximity of a target frame.

As a result of requiring a large number of frames from a single video, including a reference frame, to reconstruct a target frame, such current video compression techniques exhibit deficient compression ratios.

SUMMARY

In one embodiment of the present invention, a computer-implemented method for compressing video comprises partitioning a set of video frames into two subsets of different types of frames, a first type and a second type. The method further comprises compressing the first type of frames of videos to generate a first representation by a first stage encoder. The method additionally comprises compressing the second type of frames of video to generate a second representation that only contains soft edge information by a second stage encoder, where the soft edge information comprises multilevel edge maps.

Other forms of the embodiment of the method described above are in a system and in a computer program product.

In another embodiment of the present invention, a computer-implemented method for decompressing a set of video frames partitioned into two subsets of different types of frames, a first type and a second type, comprises decoding a first representation to reconstruct the first type of frames using a first stage decoder, where the first representation is generated by compressing the first type of frames of videos by a first stage encoder. The method further comprises training a generative model corresponding to a second stage decoder using the first type of frames, the reconstructed first type of frames, and a third representation by using a discriminator employed by a machine learning system, where the third representation is generated by compressing the reconstructed first type of frames by a second stage encoder. The method additionally comprises generating reconstructed first and second types of frames by the generative model using soft edge information after training of the generative model, where the soft edge information is contained in a second representation generated by compressing the second type of frames of video by the second stage encoder.

Other forms of the embodiment of the method described above are in a system and in a computer program product.

In a further embodiment of the present invention, a computer-implemented method for improving quality of video frame parts comprises receiving a first set of video frames when a network quality exceeds a threshold value. The method further comprises receiving a second set of video frames when the network quality does not exceed the threshold value. The method additionally comprises degrading the first set of video frames by a degrader. Furthermore, the method comprises training an enhancer to improve quality of video frames using the degraded first set of video frames using a machine learning system. Additionally, the method comprises applying the enhancer to the second set of video frames to improve a quality of the second set of video frames.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which:

FIGS. 6A1-6A5, 6B1-6B4 and 6C1-6C4 illustrate the outputs of the soft edge detector in accordance with an embodiment of the present invention;

FIGS. 7A-7C illustrate the efficiency in bits per pixel (BPP) achieved by different lossless compression schemes on a bi-level image in accordance with an embodiment of the present invention;

FIG. 9 is a table illustrating the video quality assessment of reconstructed frames in FIG. 8 in accordance with an embodiment of the present invention;

FIG. 11 is a table showing the video quality assessment of reconstructed frames in FIG. 10 in accordance with an embodiment of the present invention;

FIGS. 12B1-12B4 illustrate RD-curves using four popular perceptual video quality assessment metrics in accordance with an embodiment of the present invention;

FIGS. 14A1, 14A2a-14A2d, 14B1 and 14B2a-14B2d show the performance of the codec of the present invention as compared to H.264 in accordance with an embodiment of the present invention;

DETAILED DESCRIPTION

The principles of the present invention provide a novel video compression framework that uses a machine learning system (e.g., conditional Generative Adversarial Networks (GANs)) to achieve a better compression ratio than current prevailing standard codecs, such as H.264 and HEVC.

In one embodiment, the present invention implements a scheme that has a structure of two stages of codecs: one for current standard codecs, and another for DNN-based compression. After splitting a video into "key" frames and "non-key" frames, only key frames are used to train the codec of the present invention. The model of the present invention automatically generates low-level semantic label maps using a soft edge detector combined with a downsampler (encoder). A conditional GAN-based network decoder is then trained on "soft" edge maps and on specified key frames of a video. Only a relatively small number of key frames (1%) of a single video are required without the need for an interpolation process trained on multiple videos as in prior schemes.

Figure 1:
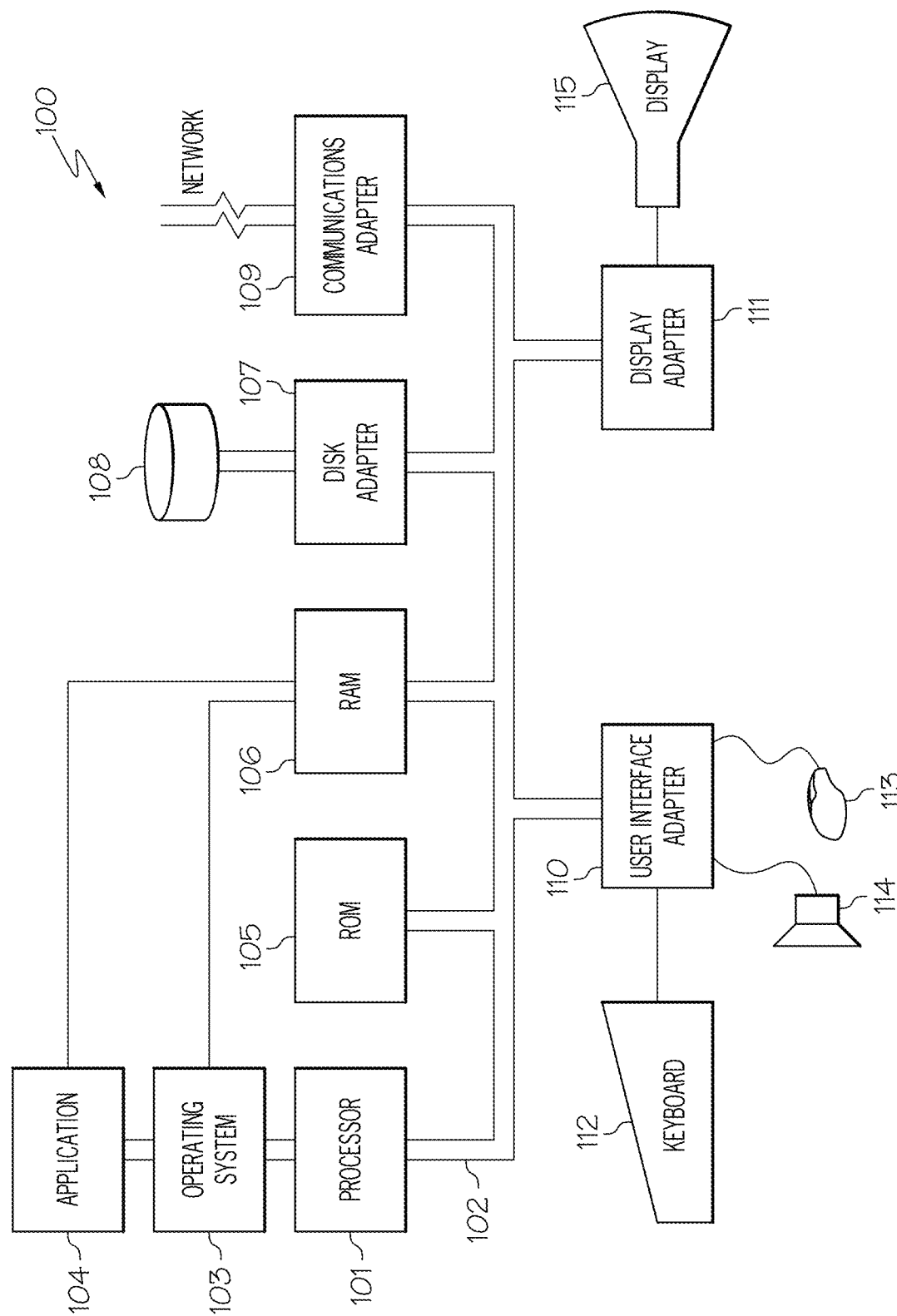
FIG. 1 illustrates a hardware configuration of a video compression system which is representative of a hardware environment for practicing the present invention.

Referring now to the Figures in detail, FIG. 1 illustrates a hardware configuration of a video compression system 100 which is representative of a hardware environment for practicing the present invention. In one embodiment, the video compression technique of the present invention may be implemented by multiple video systems, such as shown in FIG. 1. For example, one video system may focus on compressing frames of videos and related aspects, such as encoding performed by a second stage encoder (e.g., steps 201-202 and 204-205); whereas, another video system may focus on decompressing video frames and related aspects (e.g., steps 203, 206, 207 and 208 of FIG. 2). Such video systems may each be configured in a similar manner as shown in FIG. 1 and may each be located in a different location.

Referring to FIG. 1, video compression system 100 may be any type of computing device (e.g., portable computing unit, Personal Digital Assistant (PDA), smartphone, laptop computer, mobile phone, navigation device, game console, desktop computer system, workstation, Internet appliance and the like) configured with the capability of compressing video using a machine learning system (e.g., generative adversarial network).

Referring to FIG. 1, video compression system 100 may have a processor 101 connected to various other components by system bus 102. An operating system 103 may run on processor 101 and provide control and coordinate the functions of the various components of FIG. 1. An application 104 in accordance with the principles of the present invention may run in conjunction with operating system 103 and provide calls to operating system 103 where the calls implement the various functions or services to be performed by application 104. Application 104 may include, for example, an application for compressing video using a machine learning system (e.g., generative adversarial network) as discussed below in association with FIGS. 2-5, 6A1-6A5, 6B1-6B4, 6C1-6C4, 7A-7C, 8A-8D, 9-11, 12A, 12B1-12B4, 13A-13D, 14A1, 14A2a-14A2d, 14B1 and 14B2a-14B2d.

Referring again to FIG. 1, read-only memory ("ROM") 105 may be connected to system bus 102 and include a basic input/output system ("BIOS") that controls certain basic functions of video compression system 100. Random access memory ("RAM") 106 and disk adapter 107 may also be connected to system bus 102. It should be noted that software components including operating system 103 and application 104 may be loaded into RAM 106, which may be video compression system's 100 main memory for execution. Disk adapter 107 may be an integrated drive electronics ("IDE") adapter that communicates with a disk unit 108, e.g., disk drive. It is noted that the program for compressing video using a machine learning system, as discussed below in association with FIGS. 2-5, 6A1-6A5, 6B1-6B4, 6C1-6C4, 7A-7C, 8A-8D, 9-11, 12A, 12B1-12B4, 13A-13D, 14A1, 14A2a-14A2d, 14B1 and 14B2a-14B2d, may reside in disk unit 108 or in application 104.

Video compression system 100 may further include a communications adapter 109 connected to bus 102. Communications adapter 109 may interconnect bus 102 with an outside network thereby allowing video compression system 100 to communicate with other devices.

I/O devices may also be connected to video compression system 100 via a user interface adapter 110 and a display adapter 111. Keyboard 112, mouse 113 and speaker 114 may all be interconnected to bus 102 through user interface adapter 110. A display monitor 115 may be connected to system bus 102 by display adapter 111. In this manner, a user is capable of inputting to video compression system 100 through keyboard 112 or mouse 113 and receiving output from video compression system 100 via display 115 or speaker 114. Other input mechanisms may be used to input data to video compression system 100 that are not shown in FIG. 1, such as display 115 having touch-screen capability and keyboard 112 being a virtual keyboard. Video compression system 100 of FIG. 1 is not to be limited in scope to the elements depicted in FIG. 1 and may include fewer or additional elements than depicted in FIG. 1. For example, video compression system 100 may be a video surveillance system without various elements shown in FIG. 1, such as keyboard 112, mouse 113, etc. In another example, while FIG. 1 illustrates video compression system 100 with a single processor, video compression system 100 may include multiple processors.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As discussed in the Background section, deep neural networks (DNNs)-based codecs require a large volume of training video for casting the motion estimation task as an interpolation. In addition, such techniques require a reference frame to reconstruct a target frame through interpolation. The reference frame is selected under close temporal proximity of a target frame. As a result of requiring a large number of frames from a single video, including a reference frame, to reconstruct a target frame, such current video compression techniques exhibit deficient compression ratios.

The principles of the present invention provide a means for allowing video reconstruction specified by a single target video, contrary to the multiple videos required by the current DNNs-based schemes, as discussed below in connection with FIGS. 2-5, 6A1-6A5, 6B1-6B4, 6C1-6C4, 7A-7C, 8A-8D, 9-11, 12A, 12B1-12B4, 13A-13D, 14A1, 14A2a-14A2d, 14B1 and 14B2a-14B2d. Furthermore, the principles of the present invention do not require a reference frame to generate a target frame as discussed below in connection with FIGS. 2-5, 6A1-6A5, 6B1-6B4, 6C1-6C4, 7A-7C, 8A-8D, 9-11, 12A, 12B1-12B4, 13A-13D, 14A1, 14A2a-14A2d, 14B1 and 14B2a-14B2d. Additionally, the principles of the present invention enhance the video quality as discussed below in connection with FIGS. 15-17.

Figure 2:
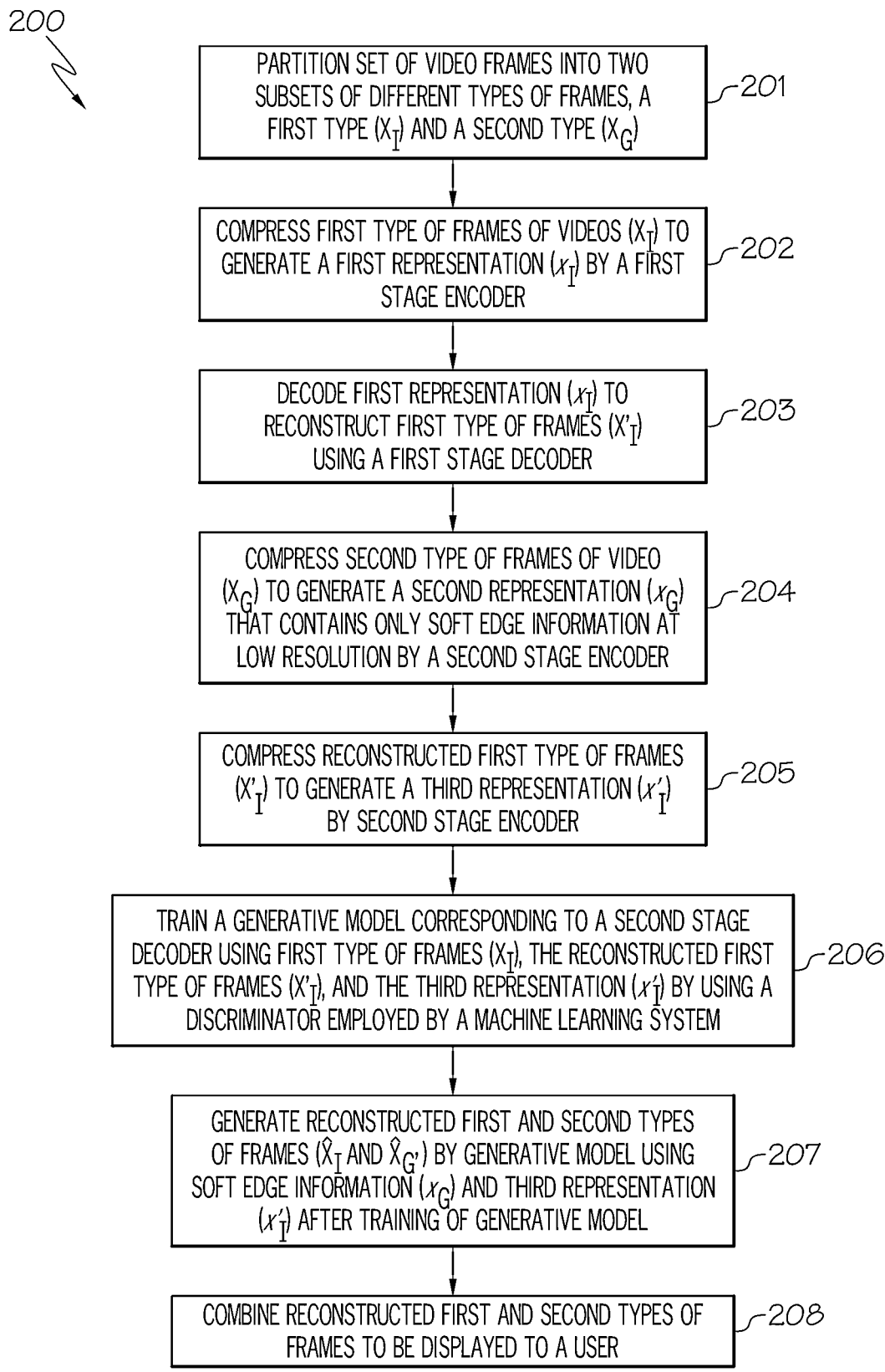
FIG. 2 is a flowchart of a method for using a machine learning system to compress video in accordance with an embodiment of the present invention.

FIG. 2 is a flowchart of a method 200 for using a machine learning system (e.g., generative adversarial network) to compress video in accordance with an embodiment of the present invention.

Referring to FIG. 2, in conjunction with FIG. 1, in step 201, video compression system 100 partitions a set of video frames into two subsets of different types of frames, a first type ($X_I$) and a second type ($X_G$). The first type is referred to herein as the "key frames," whereas, the second type is referred to herein as the "non-key frames." In one embodiment, the key frames are selected using an exhaustive search or a suboptimal greedy algorithm, although they can also be defined at predetermined temporal intervals.

In step 202, video compression system 100 compresses the first type of frames of videos ($X_I$) to generate a first representation ($x_I$) by a first stage encoder. In one embodiment, as discussed further below, the present invention utilizes two stages of encoders/decoders.

In step 203, video compression system 100 decodes the first representation ($x_I$) to reconstruct the first type of frames ($X'_I$) using a first stage decoder.

In step 204, video compression system 100 compresses the second type of frames of video ($X_G$) to generate a second representation ($x_G$) that only contains soft edge information at low resolution by a second stage encoder. Such "soft edge" information, as used herein, corresponds to multilevel edge maps that contain more than binary information (e.g., contains multi-level values as opposed to a binary value of 0 or 1). Furthermore, the level of the multilevel edge map is adjustable according to a target compression rate.

In step 205, video compression system 100 compresses the reconstructed first type of frames ($X'_1$) to generate a third representation ($x'_I$) by the second stage encoder.

In step 206, video compression system 100 trains a generative model corresponding to a second stage decoder using the first type of frames ($X_I$), the reconstructed first type of frames ($X'_I$), and the third representation ($x'_I$) by using a discriminator employed by a machine learning system (e.g., Generative Adversarial Networks (GANs)).

In step 207, the generative model of video compression system 100 generates the reconstructed first and second types of frames ($\hat{X}_I$ and $\hat{X}_G$) using soft edge information ($x_G$) and the third representation ($x'_I$) after the training of the generative model.

In step 208, video compression system 100 combines the reconstructed first and second types of frames ($\hat{X}_I$ and $\hat{X}_G$) to be displayed to a user.

A detailed discussion regarding method 200 is provided below.

In one embodiment, the video compression framework representations are learned by a conditional GAN that is guided by soft edge responses. "Soft edge," as used herein, refers to multilevel edge maps, as opposed to binary maps, generated by an edge detector.

As far as preliminaries, let $X \in \mathbb{R}^{W \times H \times 3 \times N}$ denote the set of whole frames in a video, having a spatial resolution of W×H pixels, three (RGB) channels and temporal duration of N frames. Also, let $X^{(t)} \in \mathbb{R}^{W \times H \times 3}$ denote the t-th frame of X and n(·) denote the cardinality of a set of frames, i.e., n(X)=N Each channel in a video frame is stored using 8 bits.

In one embodiment, the set of frames X of the video is partitioned into two subsets: $X_I$ and $X_G$. $X_I$ is the set of selected key frames and $X_G$ is the set of generated (non-key) frames, which are also referred to herein as the "G-frames." Let $n(X_I)=N_I$ and $n(X_G)=N-N_I$, where $N_I \in \{1, 2, \ldots N\}$. One can then write:

$$X_I = \{X_I^{(1)}, X_I^{(2)}, \ldots, X_I^{(N_I)}\}$$

$$X_G = \{X_G^{(1)}, X_G^{(2)}, \ldots, X_G^{(N-N_I)}\}. \quad (1)$$

where $X_I$ and $X_G$ are composed of any $N_I$ and $N-N_I$ frames from X, respectively. The elements of $X_I$ play a similar role as that of I-frames in conventional codecs (and convey similar advantages).

Figure 3:
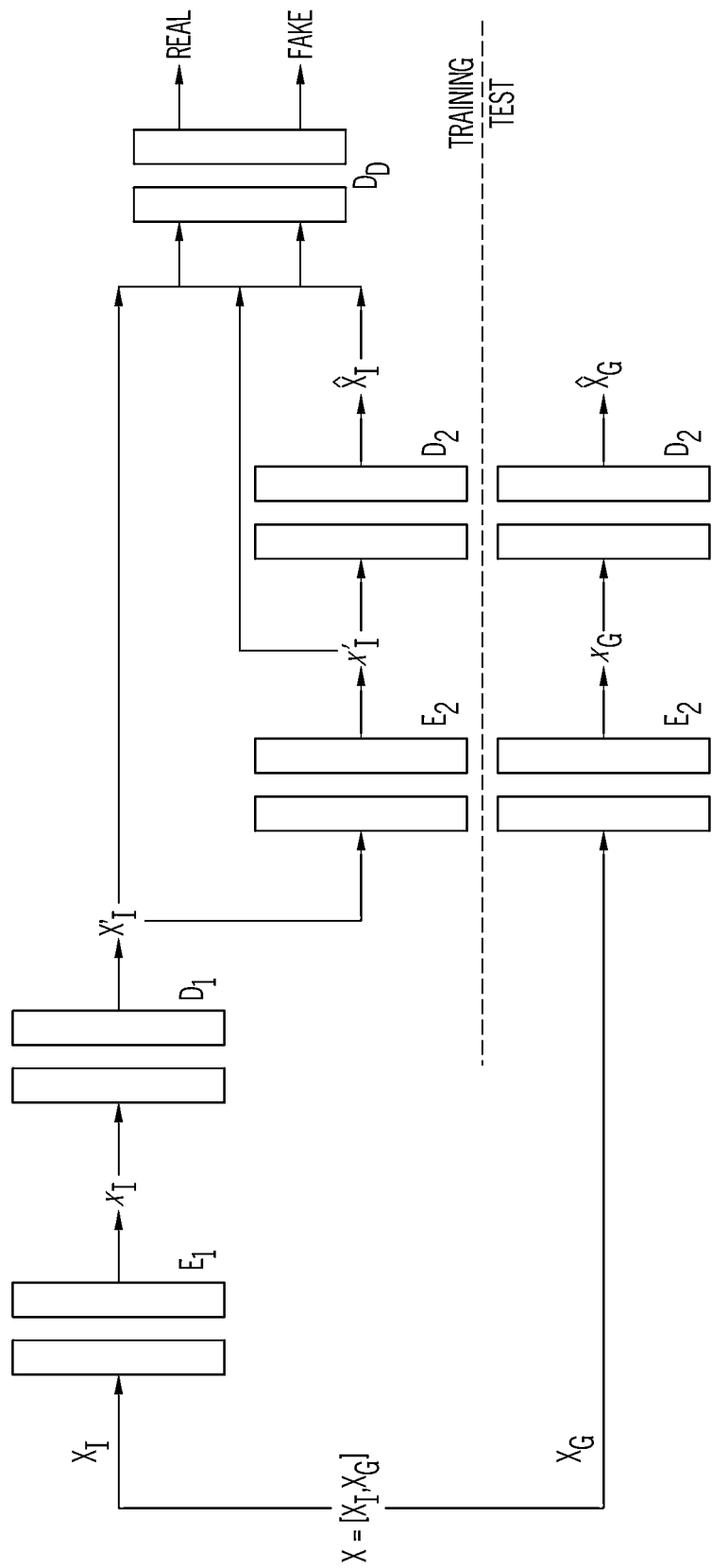
FIG. 3 illustrates a framework for adversarial video compression in accordance with an embodiment of the present invention.

In one embodiment, the GAN-based compression model of the present invention has two encoding states as shown in FIG. 3.

FIG. 3 illustrates a framework for adversarial video compression in accordance with an embodiment of the present invention.

Referring to FIG. 3, the video X, which consists of only one video to be compressed, is partitioned into two sets containing different types of frames: $X_I$ and $X_G$. $X_I$ is lightly compressed into $X_I$ using the standard H.264 encoder, while $X_G$ is highly compressed into $x_G$ that contains only soft edge information at low resolution. "Soft edge" information, as used herein, refers to multilevel edge maps. The $X_I$ are used to train a generative model corresponding to the second-stage decoder ($D_2$). This generative model is trained at the receiver using $x'_I$ and $X'_I$ using a discriminator $D_D$. After training, $D_2$ takes soft edges $x_G$ as input and produces reconstructed frames. In one embodiment, only $x_I$ and $x_G$ are required to reconstruct the decompressed video as discussed further below.

In one embodiment, at the first stage, the frames in $X_I$ are compressed by the encoder $E_I$ to generate a representation $x_I$. Then, the decoder $D_1$ decodes $x_I$ to reconstruct $X'_I$. If $n(X_I)<N$, then $X'_I$ and $X_G$ further follow a second stage of encoding; the encoder $E_2$ encodes $X'_I$ and ($X_G$) to generate $x'_I$ and $x_G$. Then, the second stage decoder ($D_2$) decodes $x'_I$ and $x_G$ yielding the reconstructions $\hat{X}_I$ and ($\hat{X}_G$). It is noted that any conventional codec can be used to implement $E_I/D_I$.

In one embodiment, $E_I=D_I$ is implemented using a conventional H.264 encoder (decoder), which is efficient and performs very well for key frame compression. In one embodiment, if every frame is selected as a key frame, then the scheme of the present invention degenerates to a frame-based H.264 encoder, without any motion prediction/compensation.

Figure 4:
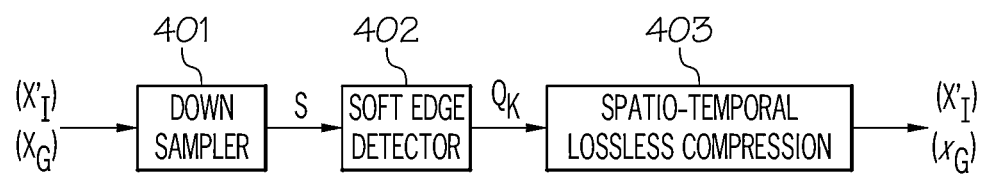
FIG. 4 is a diagram illustrating the overview of the second encoding stage ($E_2$) in accordance with an embodiment of the present invention.
Figure 5:
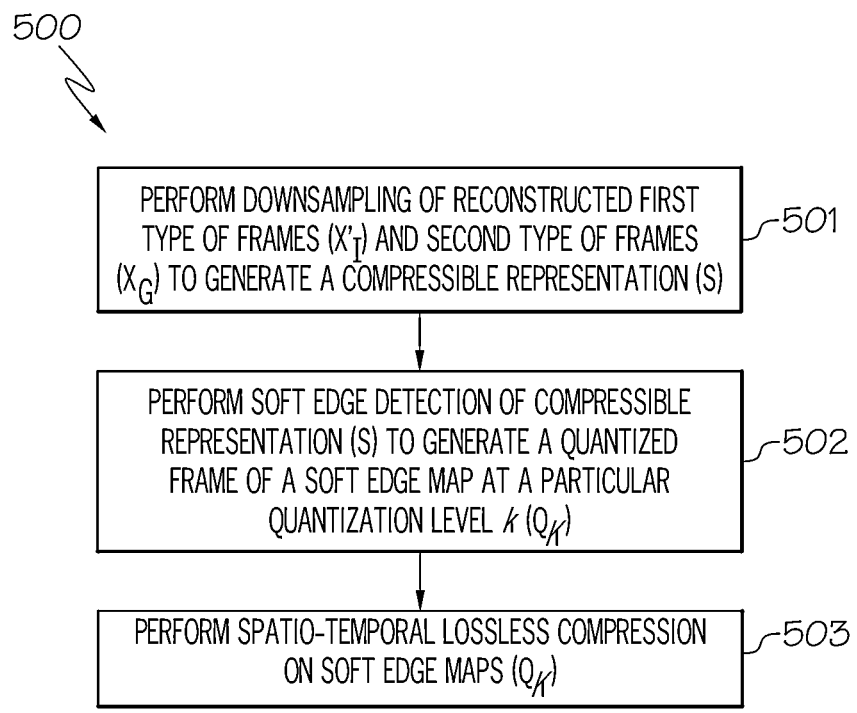
FIG. 5 is a flowchart of a method for encoding during the second stage using the software components of FIG. 4 in accordance with an embodiment of the present invention.

In one embodiment, the second encoding stage is significantly different and involves a series of steps: down-sampling, soft edge detection and a spatio-temporal edge map compression scheme as shown in FIG. 4 and discussed in FIG. 5. The corresponding decoder $D_2$ is trained using a GAN and a discriminator $D_D$.

Referring to FIG. 4, FIG. 4 is a diagram illustrating the overview of the second encoding stage ($E_2$) in accordance with an embodiment of the present invention. In one embodiment, the software components shown in FIG. 4 may reside in application 104 (FIG. 1) of video compression system 100.

As shown in FIG. 4, a down sampler 401 performs downsampling of the reconstructed first type of frames ($X'_I$) and second type of frames ($X_G$) to generate a compressible representation (S). A soft edge detector 402 performs the soft edge detection of the compressible representation (S) to generate a quantized frame of a soft edge map at a particular quantization level k ($Q_K$). Furthermore, as shown in FIG. 4, a lossless compressor 403 performs spatio-temporal lossless compression on soft edge maps ($Q_K$) resulting an output of $x'_I$ and $x_G$.

FIG. 5 is a flowchart of a method 500 for encoding during the second stage using the software components of FIG. 4 in accordance with an embodiment of the present invention.

Referring to FIG. 5, in conjunction with FIGS. 1-4, in step 501, down sampler 401 preforms downsampling of the reconstructed first type of frames ($X'_I$) and the second type of frames ($X_G$) to generate a compressible representation (S).

In step 502, soft edge detector 402 performs the soft edge detection of the compressible representation (S) to generate a quantized frame of a soft edge map at a particular quantization level k ($Q_K$). In one embodiment, the soft edge map includes a map of multilevel edges.

In step 503, lossless compressor 403 performs spatio-temporal lossless compression on soft edge maps ($Q_K$) resulting an output of $x'_I$ and $x_G$.

A further discussion regarding method 500 of FIG. 5 and the software components of FIG. 4 is provided below.

In one embodiment, a conditional GAN is employed to train $D_2$ using pairs of key frames and their corresponding soft edge maps. During training, $D_2$ learns associations between the key frames and the soft edge maps. Once $D_2$ is trained, it can be guided by the soft edge maps $x_G$ to reconstruct the G-frames $X_G$ (non-key frames), which the decoder has never seen before. When the soft edge map contains more information, it can guide the decoder to reconstruct frames with better quality.

As discussed above, the second encoding stage is composed of a down sampler 401 and a soft edge detector 402 which feeds a lossless compressor 403. Let S and $Q_K$ denote the outputs of down sampler 401 and soft edge detector 402, and $x'_I$ and $x_G$ be the outputs of lossless compressor 403, respectively. The downsampling step reduces the spatial resolution of each frame, but does not affect the number of frames. In one embodiment, the purpose of downsampling is to produce a more compact representation that is easier to compress.

Following downsampling, a soft edge detection step is performed, which further produces a compressible representation of S. In one embodiment, an edge detector, such as the Canny edge detector, is applied to find an edge pixel map $I=[I_{i,j}]$, where $$I_{i,j} = \begin{cases} 1, & \text{if } (i,j) \text{ is an edge} \\ 0, & \text{else} \end{cases},$$

It is noted for clarity that any edge detector may be utilized and that a Canny edge detector is discussed herein for illustration purposes.

Following edge detection, vector quantization is performed to form clusters of colored pixels mapped to edge pixels, i.e., $$q'_{i,j} = V_k(s_{i,j} \cdot I_{i,j}) \qquad (2)$$

where s(i,j) and q(i,j) are the (i,j)-th elements of the downsampled frame S and a subsequent quantized frame Q. $V_k(\bullet)$ is a vector quantizer which uses the k-nearest mean, to form k−1 clusters of colored pixels mapped to $I_{i,j}=1$. The large cluster of pixels $I_{i,j}=0$ is not included.

The aforementioned soft edge detection approach is illustrated in 6A1-6A5, 6B1-6B4 and 6C1-6C4. FIGS. 6A1-6A5, 6B1-6B4 and 6C1-6C4 illustrate the outputs of soft edge detector 402 (FIG. 4) in accordance with an embodiment of the present invention. In particular, FIGS. 6A1-6A5 illustrate that the left-most frame is a 64×64 downsampled frame $S^{(1)}$ from a reconstructed frame $X'_I{}^{(1)'}$ of one video. The right four frames are outputs of soft edge detector 402 for different levels of quantization k ($Q_k$). FIGS. 6B1-6B4 illustrate the grayscale histograms of $Q_k$. FIGS. 6C1-6C4 illustrate the three dimensional scatter plots (normalized R/G/B axes) of S, where shades visually distinguish the clusters indexed by $Q_k$.

The aforementioned soft edge detection approach is illustrated in FIGS. 6A1-6A5, 6B1-6B4 and 6C1-6C4. As shown in FIGS. 6A1-6A5, a 64×64 frame is downsampled from a reconstructed 256×256 frame $X'_I{}^{(1)'}$ from one video of the YouTube® Pose dataset. The next four frames in FIGS. 6A1-6A5 are outputs from soft edge detector 402 for several different levels of quantization. As the quantization level k is decreased, the cardinality of shades co-located with edges decreases. FIGS. 6B1-6B4 plot the histograms of the grayscale brightness in each $Q_k$. Each video will have a different set of centroids for a given k. FIGS. 6C1-6C4 depict three-dimensional scatter-plots (R/GB axis) of S with different shades assigned to each of its clusters $Q_k$. The maps $Q_{256}$ and $Q_8$ in FIGS. 6A1-6A5 appear quite similar, yet the entropy of $Q_8$ is much reduced relative to that of $Q_{256}$ (2.0904 vs 7.0358).

Since most of the outputs Q of the soft edge detector are zero, it may be useful to perform lossless compression on the generated soft edge maps. In one embodiment, the following lossless compression scheme is devised. In one embodiment, the run-length encoding is applied on the soft edge maps along both the spatial and the temporal directions. Then, another lossless compression step is performed using Huffmann encoding.

Thanks to the sparse nature of the soft edge maps, the scheme of the present invention produces excellent compression results compared to JBIG2, a state-of-the-art approach for bi-level image compression. As shown in FIGS. 7A-7C, FIGS. 7A-7C illustrate the efficiency in bits per pixel (BPP) achieved by different lossless compression schemes on a bi-level image in accordance with an embodiment of the present invention. FIG. 7A illustrates $X'_{I_1}$ and $x'_{I_1}$ where $x_{I_1}$ is located at the right-lower corner. FIG. 7B illustrates $x_{I_1}$ which was magnified for visualization. FIG. 7C is a table with entries showing bit per pixel (BPP) of the compressed lossless algorithms.

With respect to the second stage decoder, $D_2$, in one embodiment, a conditional GAN framework is utilized to train the decompressor $D_2$ and discriminator $D_D$ by parsing the compressed data $x'_i$ into both original data $X'_I$ and decompressed data $\hat{X}_I$ in an adversarial manner. It is noted that, in one embodiment, only key frames are used to train $D_2$ and $D_D$. In one embodiment, the objective function of the conditional GAN can be expressed as $$L(D_2, D_D) = \mathbb{E}_{X_I}[h(X_I)]. \quad (3)$$

where $D_2$ and $D_D$ are trained on the pairs of frames generated by

A discussion regarding experimental results is now deemed appropriate.

In order to conduct a quantitative performance analysis, several Video Quality Assessment (VQA) metrics were deployed: Peak Signal-to-Noise Ratio (PSNR), Structural Similarity Index (SSIM), Multi-Scale (MS)-SSIM and Video Multimethod Assessment Fusion (VMAF). In one embodiment, the following two publicly available video datasets were used for the experiments: KTH dataset and the YouTube® Pose dataset.

The KTH dataset includes 600 short videos (6 types of actions, 25 people, 4 different scenarios). Each video contains between 400 and 800 frames. From these, 100 videos were randomly collected.

The YouTube® Pose dataset is comprised of 45 YouTube® videos. Each video contains between 2,000 and 20,000 frames, covering a broad range of activities by a single person: dancing, stand-up comedy, sports and so on. 13 of the videos were excluded owing to their long durations (>15 min; 7 videos), frequent scene changes (6 videos), and one duplicated video. The remaining 31 videos were included in the analysis.

With respect to implementation, the decoder $D_2$ of the second stage is trained by a discriminator $D_D$. In the experiments, the original frames were re-sized and cropped to size $2^8 \times 2^8$ over eight consequent layers. A stride size of 2×2 was used when training the DNNs. The model of the present invention can be implemented using any options for resizing and cropping. The batch size and the number of epochs were fixed at 1 and 1000, respectively.

In one embodiment, the second stage encoder $E_2$ has a predetermined structure composed of a down sampler 401, soft edge detector 402 and lossless compressor 403 as previously discussed in connection with FIG. 4. In one embodiment, to simplify experiments, down sampler 401 only scaled the frames by factors for 4×4 and 8×8.

Figure 8A:
FIGS. 8A-8D illustrate the performance of the proposed framework against different downsampling levels in accordance with an embodiment of the present invention.
Figure 8B:
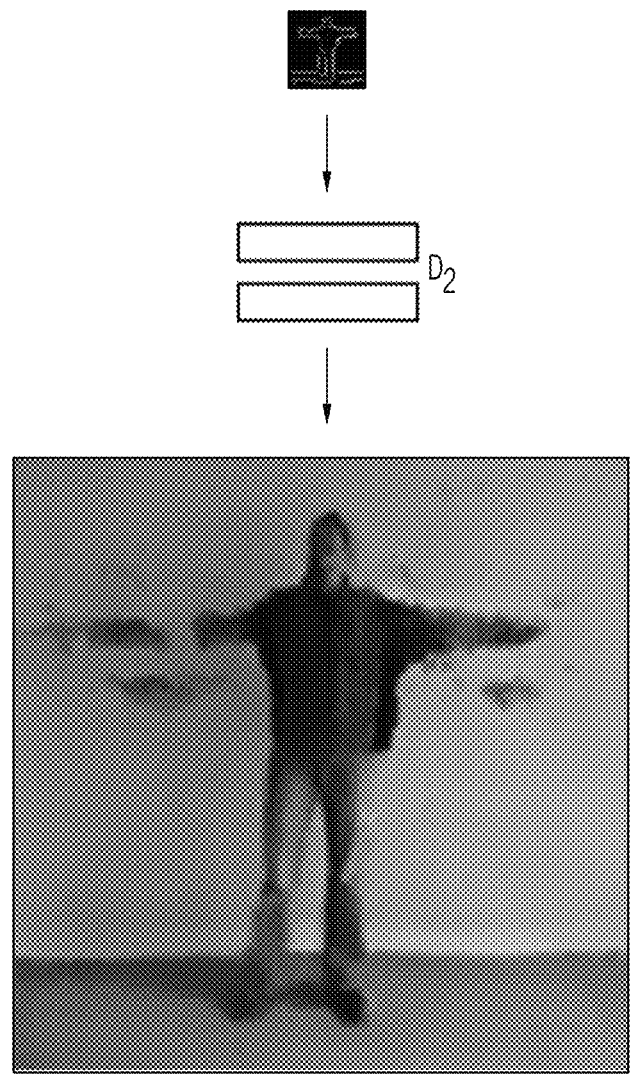
Figure 8C:
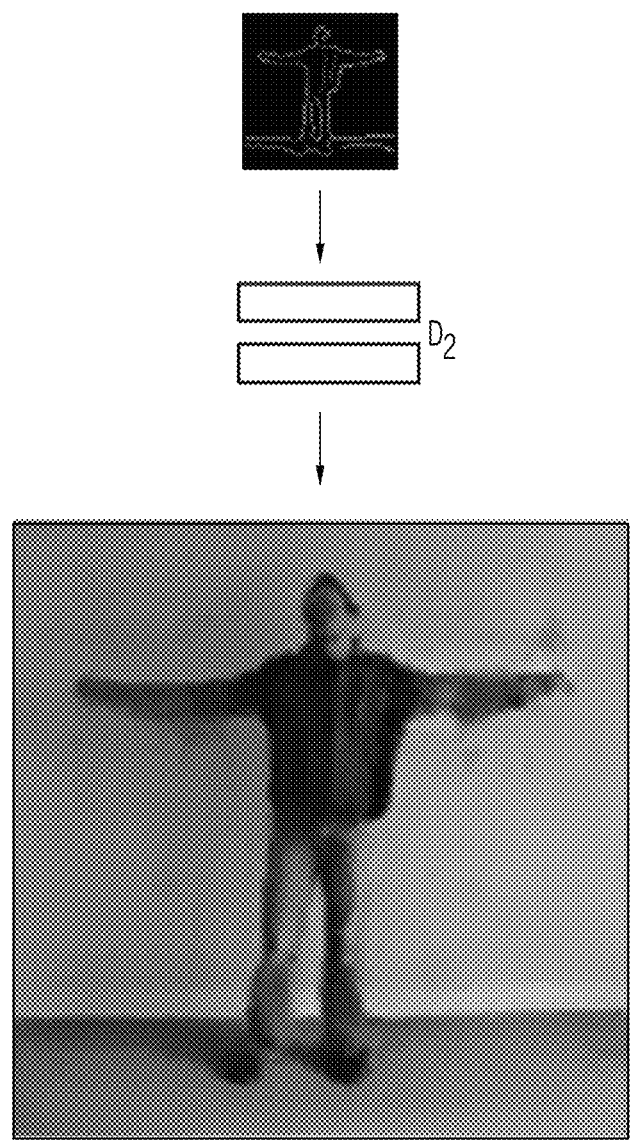
Figure 8D:
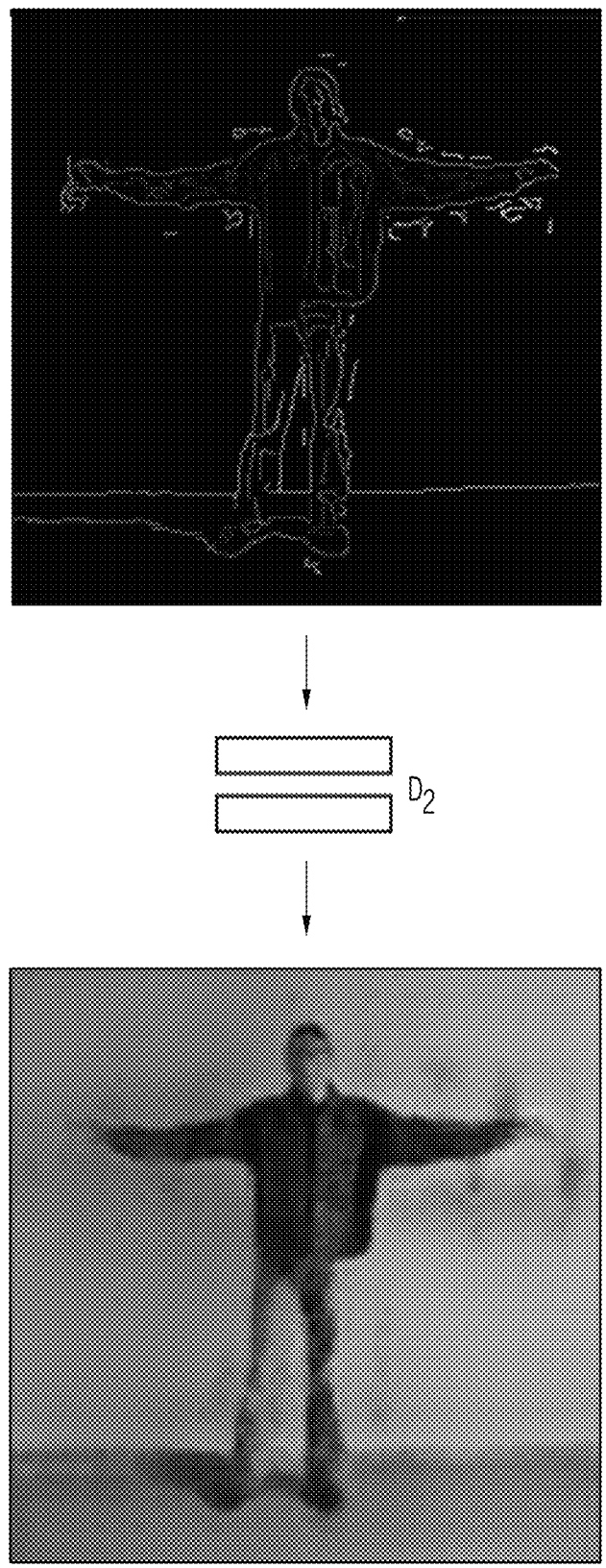

To study the relative qualities of reconstructed frames using different levels of downsampling, three scaling sizes, (1, 1), (4, 4) and (8, 8) were employed. Hence, an original frame of size 256×256, became 256×256, 64×64, and 32×32, respectively, as shown in FIGS. 8A-8D. FIGS. 8A-8D illustrate the performance of the proposed framework against different downsampling levels, such as the original 256×256 frame, $X_G$, shown in FIG. 8A, in accordance with an embodiment of the present invention. FIG. 8B illustrates reconstruction at scales 32×32. FIG. 8C illustrates reconstruction at 64×64. FIG. 8D illustrates reconstruction at 256×256. As illustrated in FIGS. 8A-8D, as the resolution increases, the reconstructed frames become more recognizable.

FIG. 9 is a table illustrating the video quality assessment of the reconstructed frames in FIG. 8 in accordance with an embodiment of the present invention. As the resolution increases, the quality scores of the reconstructed frame increase monotonically.

Furthermore, the quality of the reconstructed quantized frame was examined. In particular, the relationship between the quality of reconstructed frames and the level of quantization delivered by soft edge detector 402 was examined. As an example, assume $E_1 = E_2 = I$, i.e., $X_I = X'_I$. Assume further that $E_2$ is taken to soft edge detector 402 with quantization level k ($Q_k$) without any downsampling. First, a quantization k=2 is applied to generate $x'_I$. Then, $D_2$ was trained on a single pair $X'_1{}^{(1)}$ and $x'_I{}^{(1)}$ (both frames composed of 256×256 pixels). The trained $D_2$ was then applied on $x'_G{}^{(1)}$ to reconstruct $\hat{X}_G{}^{(1)}$ as shown in FIG. 10.

Figure 10:
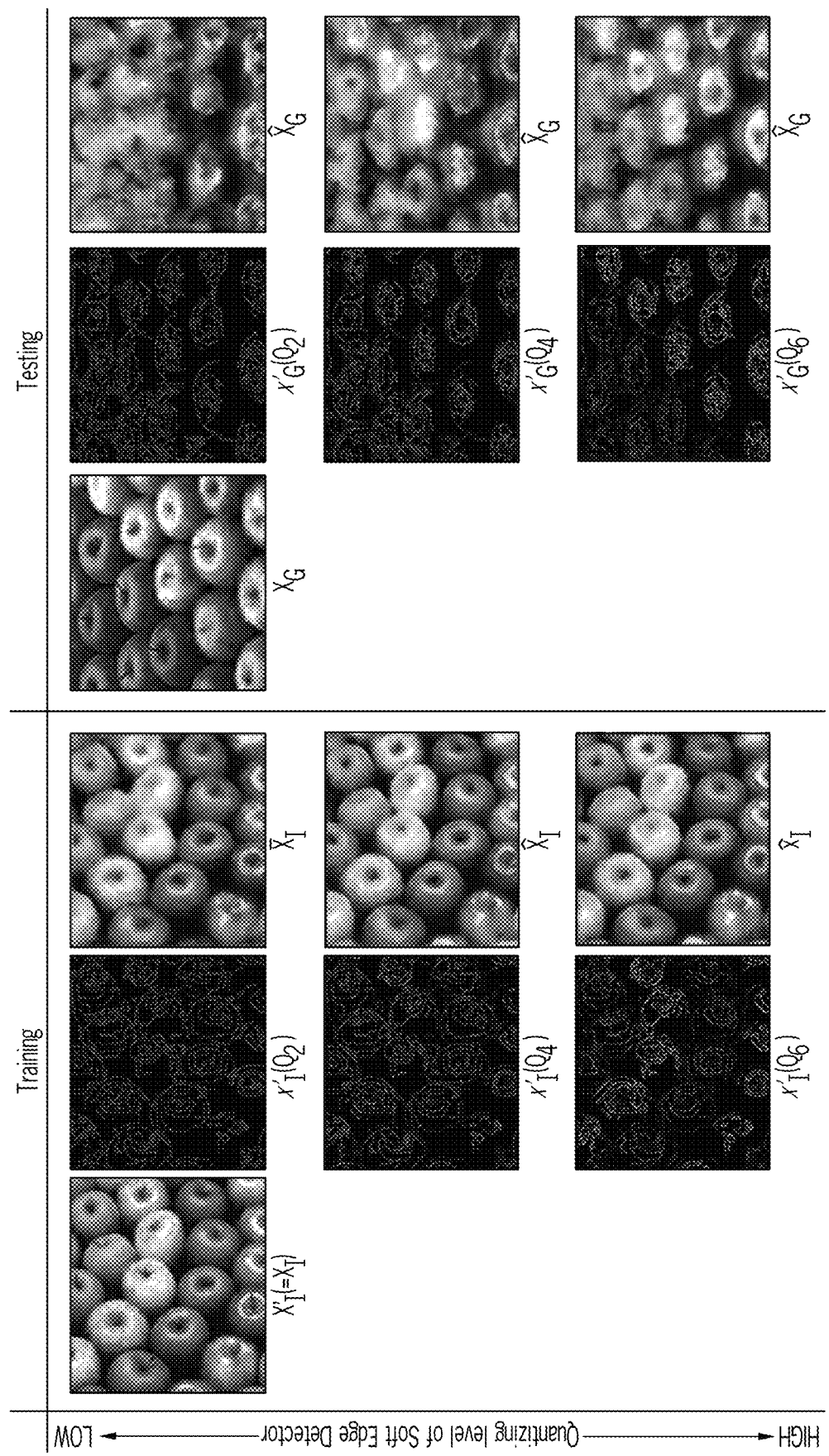
FIG. 10 illustrates the performance of the framework of the present invention against different quantization levels k of the soft edge detector ($Q_k$) in accordance with an embodiment of the present invention.

FIG. 10 illustrates the performance of the framework of the present invention against different quantization levels k of the soft edge detector ($Q_k$) in accordance with an embodiment of the present invention. As the quantization level is increased (more clusters), the reconstructed representations become more precise and similar to the original frames.

FIG. 11 is a table showing the video quality assessment of the reconstructed frames in FIG. 10 in accordance with an embodiment of the present invention. As k is increased, the quality of the reconstructed frames improved.

Furthermore, in one embodiment, this experiment was repeated with k=4 and k=8. In this example, the network of the present invention was trained on only one image, assuming no compression for $X_I$ ($X'_I = X_I$). In addition, at the second stage of encoding, no down sampler or lossless compression was used.

As the quantization level k was increased, the quality of the reconstructed frames improved qualitatively ($\hat{X}_G$ in FIG. 10). This improvement was also measured by quantitative VQA scores, which also indicated a trend of improvement with a higher value of k (See FIG. 11).

In the framework of the present invention, the performance and bitrate are closely associated with α, which is defined as the ratio of the number of key frames to the total number of frames in one video. In one embodiment, α was set at ≤1.5%.

Figure 12A:
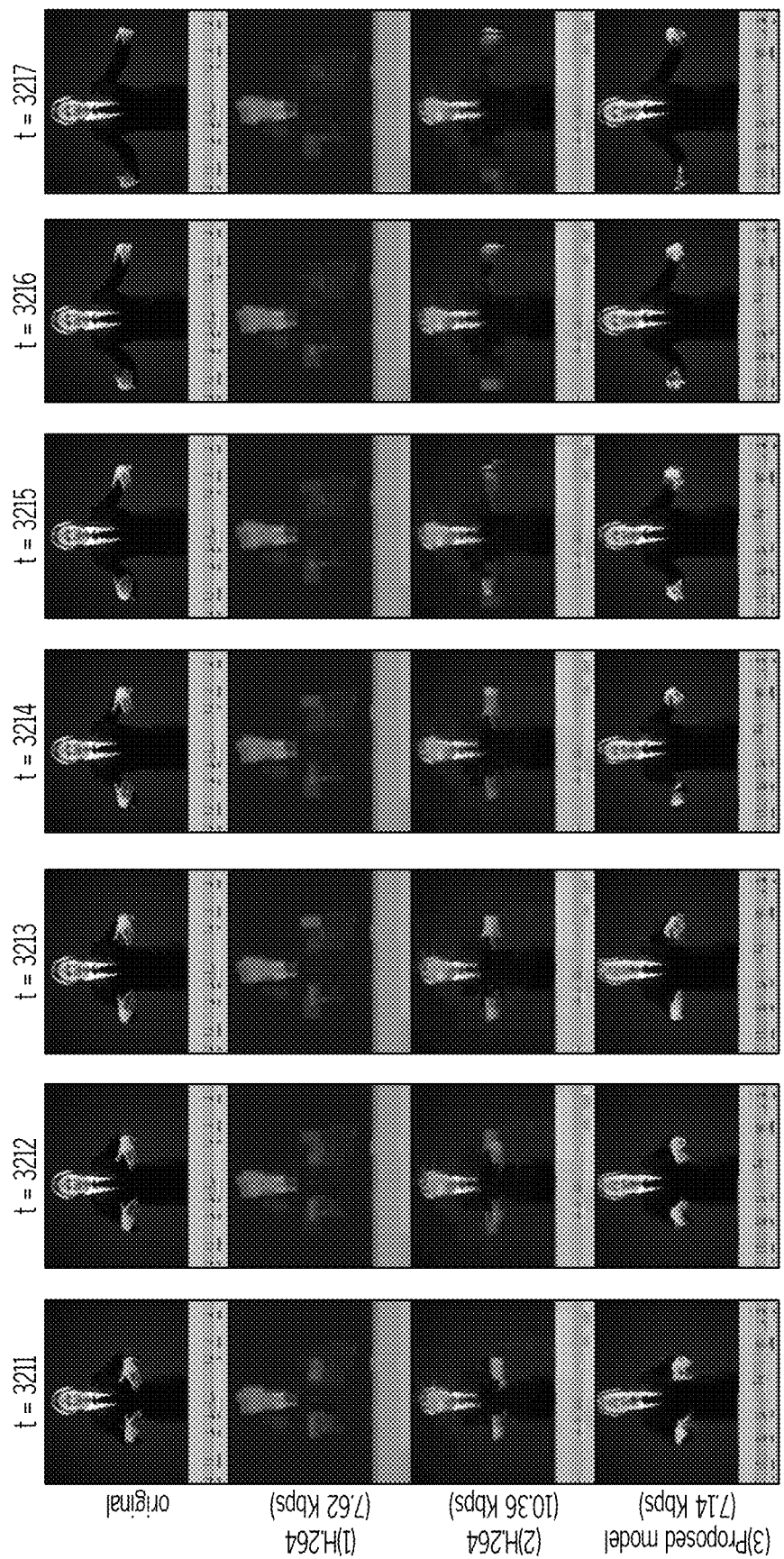
FIG. 12A illustrates seven consecutive frames from an original video and three compressed videos: (1) H.264 at 7.62 Kbps, (2) H.264 at 10.36 Kbps, and (3) the model of the present invention at 7.14 Kbps in accordance with an embodiment of the present invention.
Figure 13A:
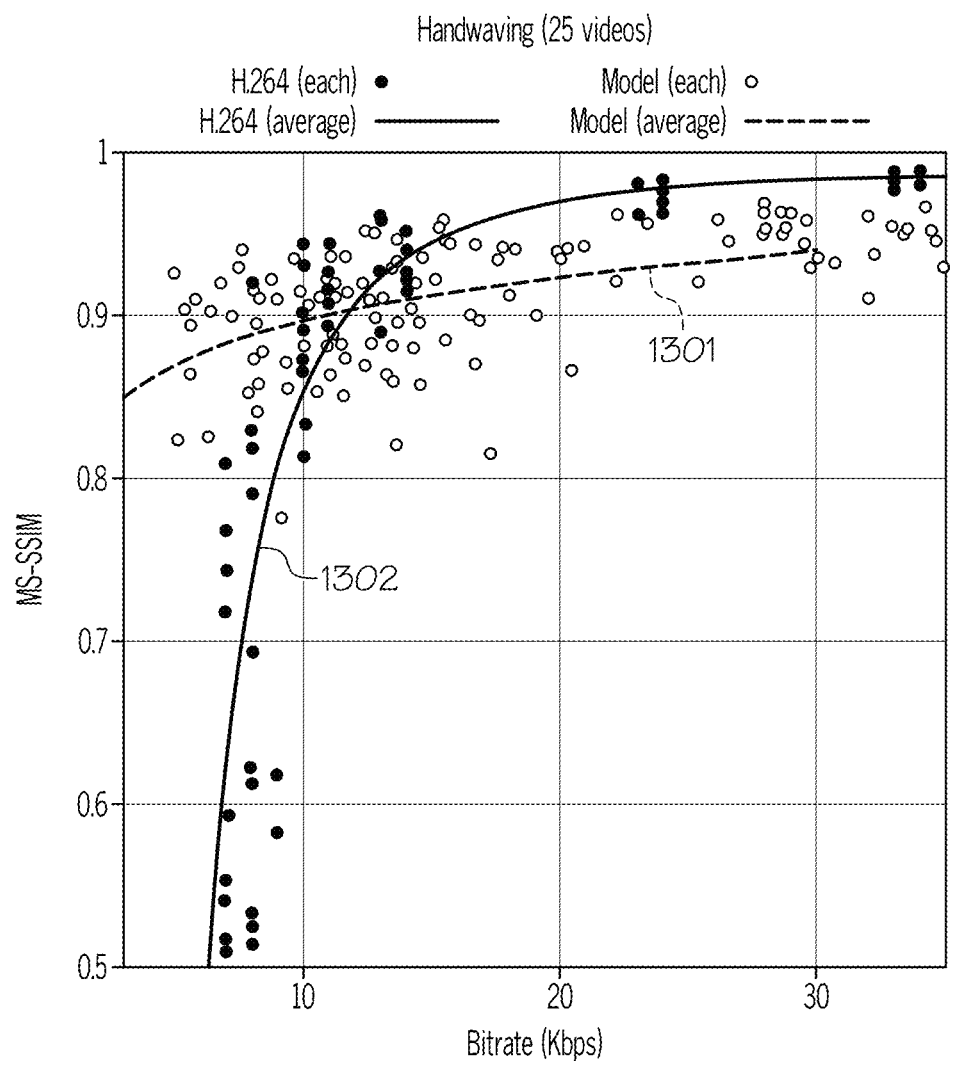
FIGS. 13A-13D plot RD curves of bitrate against VQA scores for 100 videos in accordance with an embodiment of the present invention.
Figure 13B:
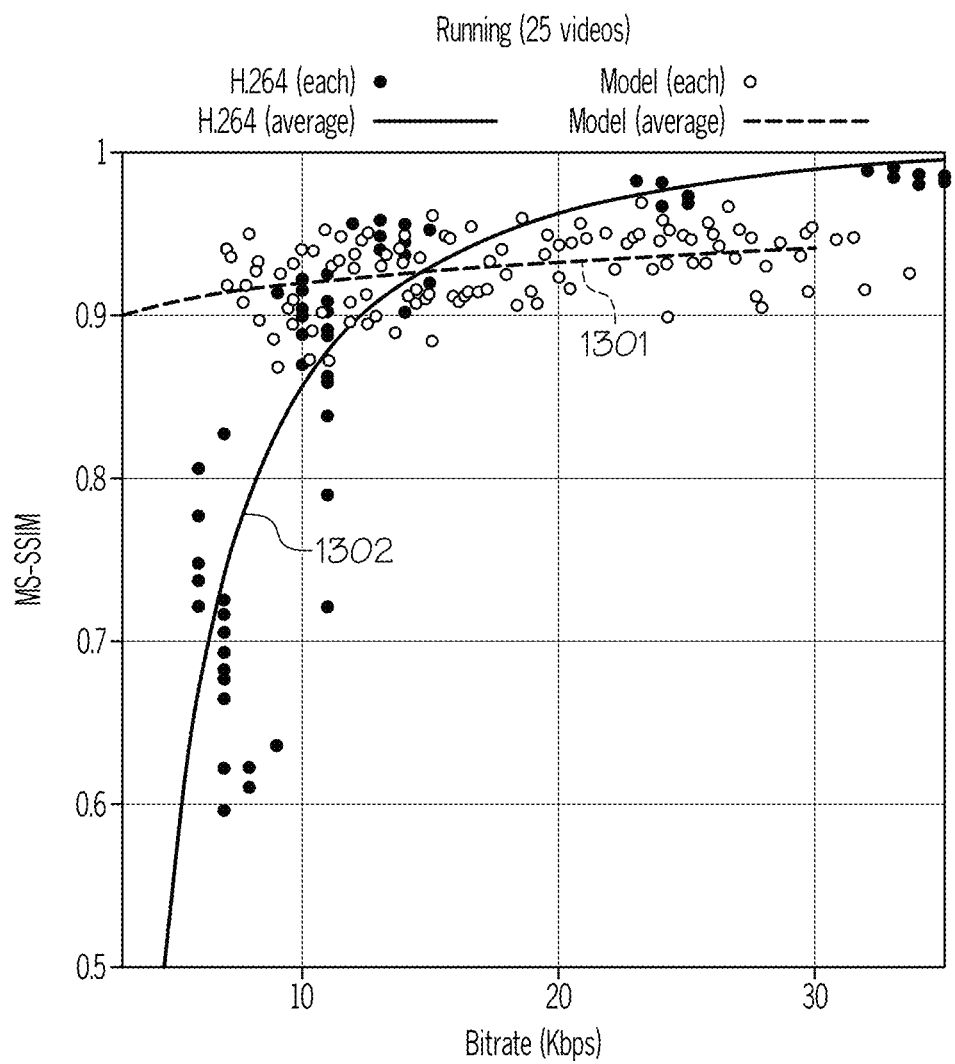
Figure 13C:
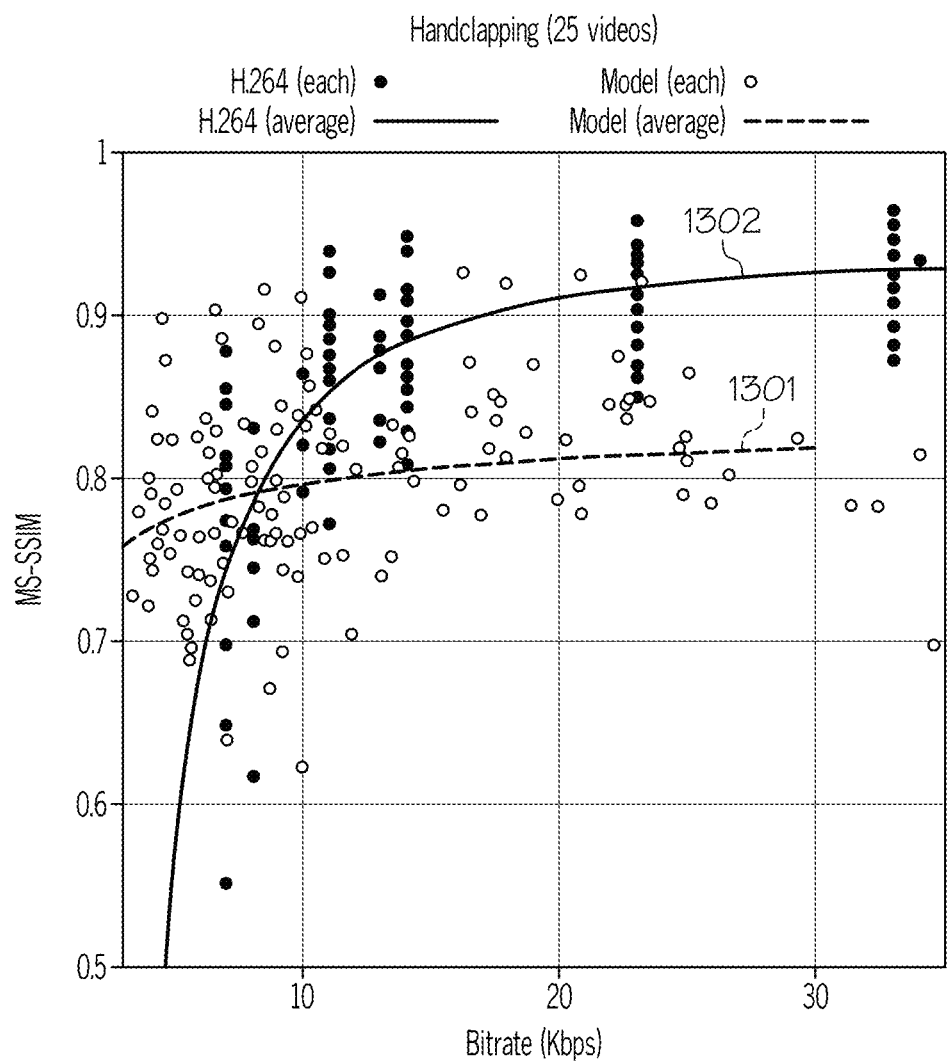
Figure 13D:
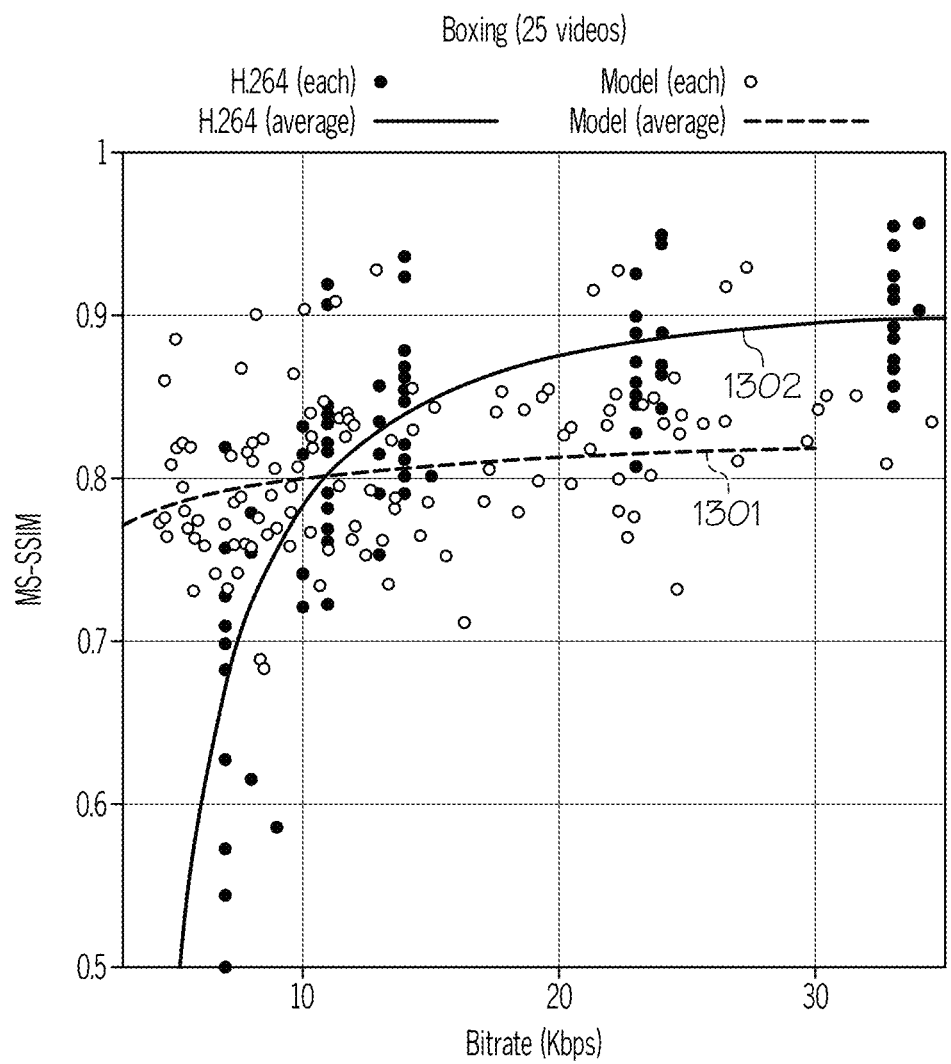

One of the experimental results is summarized in FIGS. 12A and 12B1-12B4. FIG. 12A illustrates seven consecutive frames from an original video and three compressed videos: (1) H.264 at 7.62 Kbps, (2) H.264 at 10.36 Kbps, and (3) the model of the present invention at 7.14 Kbps in accordance with an embodiment of the present invention. The model of the present invention delivered noticeably better quality at the lowest bitrate than H.264. To train the network using a conditional GAN, 80 key frames ($N_f$=80) were collected from a single video having 8000 frames (α=1%), and assigned 2.02 Kbps of the overall 7.14 Kbps. Seven test frames were not included in the training set. In one embodiment, an 8×8 down sampler and the $Q_8$ soft edge detector are employed. As a method of objective quantitative analysis, the scores produced by several leading perceptual video quality metrics (PSNR, mean SSIM, mean MS-SSIM, and VMAF scores) were plotted for the reconstructed videos as shown in FIGS. 12B1-12B4. FIGS. 12B1-12B4 illustrate RD (Rate-Distortion)-curves using four popular perceptual video quality assessment metrics in accordance with an embodiment of the present invention. Curves 1201 denote the results of the model of the present invention, while curves 1202 are those for H.264. The model of the present invention was able to achieve much higher video quality scores below 10 Kbps than did H.264. Furthermore, the codec of the present invention was able to successfully compress the video at less than 7.5 Kbps, while H.264 failed (no output).

To examine the performance of the proposed method, an experiment on videos from four semantic categories in the KTH were implemented. FIGS. 13A-13D plot RD curves of bitrate against VQA scores for 100 videos in accordance with an embodiment of the present invention. Curves 1301 correspond to the model of the present invention while curves 1302 represent the performance of H.264. Notably, in the below 10 Kbps, the scheme of the present invention achieved significantly higher MS-SSIM scores than did H.264. Similar results were observed on PSNR, SSIM and VMAF.

FIGS. 14A1, 14A2a-14A2d, 14B1 and 14B2a-14B2d show the performance of the codec of the present invention as compared to H.264 in accordance with an embodiment of the present invention. FIGS. 14A1 and 14B1 show selected frames from both an original KTH video and also compressed videos using H.264 at 9 Kbps, H.264 at 13 Kbps, and the compression model of the present invention. The videos are aligned vertically for visual comparison. Curves 1401 correspond to the model of the present invention while curves 1402 represent the performance of H.264. The codec of the present invention (4th row) delivered significantly better visual quality at low bitrates than did H.264. As a method of objective quantitative analysis, VQA metrics were plotted in FIGS. 14A2a-14A2d and 14B2a-14B2d based on the frames shown in FIGS. 14A1 and 14B1, respectively. For example, the model of the present invention achieved MS-SSIM of 0.9188 at 8.33 Kbps, while H.264 resulted in an MS-SSIM score of 0.8884 at 13 Kbps. Since most of the videos in the KTH dataset contain simple, repeated object movements, the model of the present invention was further validated on a variety of videos from the YouTube® dataset, which contain more diverse activities and unpredictable movements.

FIG. 14B1 visually compares compression performance on one YouTube® video. The codec of the present invention outperformed H.264 regards to perceptual quality versus bitrate. Similar results were observed on the other 30 videos from the YouTube® Pose dataset.

As a result of the present invention, video reconstruction can be performed by specifying a single target video, while current DNNs-based schemes require multiple videos. In addition, the scheme of the present invention does not require any reference frame to reconstruct a target frame while current DNNs-based schemes do for interpolation. As discussed herein, the scheme of the present invention achieves higher visual quality in a low bitrate less than 10 kbps than current standard codecs, such as H.264 and HEVC. In addition, the present invention provides a practical method to adjust striding sizes of a neural network based on a resolution of the frames as discussed below.

In one embodiment, the number of layers and stride sizes of DNNs could be designed to process original sized frames without resizing according to the pre-determined striders' size. For example, in one embodiment, the original video has a resolution of 1280×720 and the DNN structure is configured with seven layers and seven sets of strides (2; 2); (2; 2); (2; 2); (2; 3); (2; 3); (2; 5) and (2; 5).

Furthermore, as a result of implementing the present invention, a better compression ratio can be achieved than current prevailing standard codecs.

Furthermore, the quality of streaming video is degraded at certain times, such as due to location. For example, when a user enters a subway tunnel, the quality of the streaming video suffers, such as including more blurred pixels. In one embodiment, the quality of the video frame is evaluated by system 100 using a mathematical model that has been trained to determine the quality of the video frame, such as by analyzing various factors of the video frame, such as resolution, frame rate, bit rate, bit depth, compression ratio, bits/pixel/frame (BPF), etc. For example, a statistical model may be utilized in which several independent variables (e.g., BPF) are fit against results obtained in a subjective quality evaluation test using regression techniques.

In one embodiment, the quality of the video frames is correlated with the quality of the network. "Quality of the network," as used herein, refers to the Quality of Service (QoS) of the network. To quantitatively measure quality of service, several related aspects of the network service are often considered, such as packet loss, bit rate, throughput, transmission delay, availability, jitter, etc. In one embodiment, such quality of service is evaluated by system 100 measuring QoS parameters (e.g., latency, jitter, packet loss, throughput) utilizing NetIQ® Chariot or the system implemented by Beuran et al., "Network Quality of Service Measurement System for Application Requirements Evaluation," SPECTS'03, 2003, pp. 380-387, which is incorporated by reference herein in its entirety.

Referring to the example above, when the user is located in a subway tunnel, the QoS parameters of the network would indicate that the quality of the network is poor. As a result, when the quality of the network is poor, such as when the user is located in a subway tunnel, the quality of the streaming video may also be poor. As discussed below in connection with FIG. 15, embodiments of the present invention can improve the quality of the streaming video parts in such situations.

Figure 15:
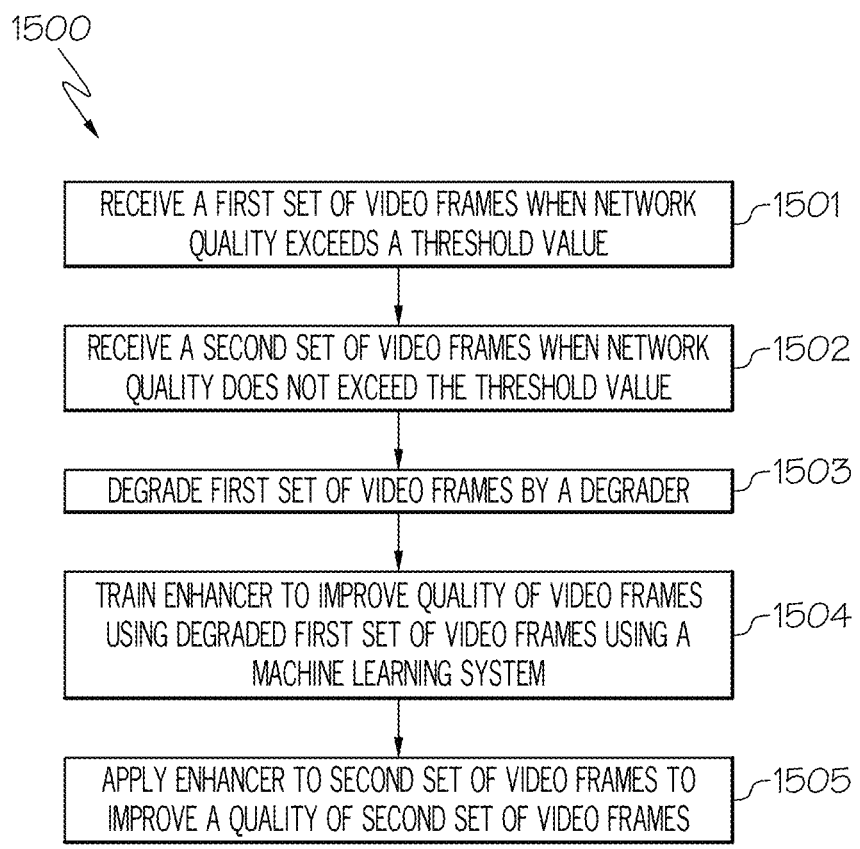
FIG. 15 is a flowchart of a method for improving the quality of the streamed video frame parts in accordance with an embodiment of the present invention.

FIG. 15 is a flowchart of a method 1500 for improving the quality of the streamed video frame parts in accordance with an embodiment of the present invention.

Referring to FIG. 15, in conjunction with FIGS. 1-5, in step 1501, system 100 receives a first set of vide frames ($X_I$) when the network quality exceeds a threshold value.

In one embodiment, $X_I$ corresponds to the video frames which are received when the network quality is deemed to be good (referred to as a "high quality frame"). In one embodiment, the network quality is deemed to be good when the measured QoS parameters (can be a single QoS parameter or a combination of QoS parameters) exceed a threshold value. In one embodiment, such frames are classified as "training samples" and are used by the machine learning system to train the degrader-enhancer pair (discussed further below).

In step 1502, system 100 receives a second set of video frames ($X_G$) when the network quality does not exceed the threshold value.

In one embodiment, $X_G$ corresponds to the video frames which are received when the network quality is deemed to be poor. Such frames are classified as "test samples." In one embodiment, the network quality is deemed to be poor when the measured QoS parameters (can be a single QoS parameter or a combination of QoS parameters) do not exceed a threshold value.

In step 1503, system 100 degrades the first set of video frames by a degrader (D).

Figure 16:
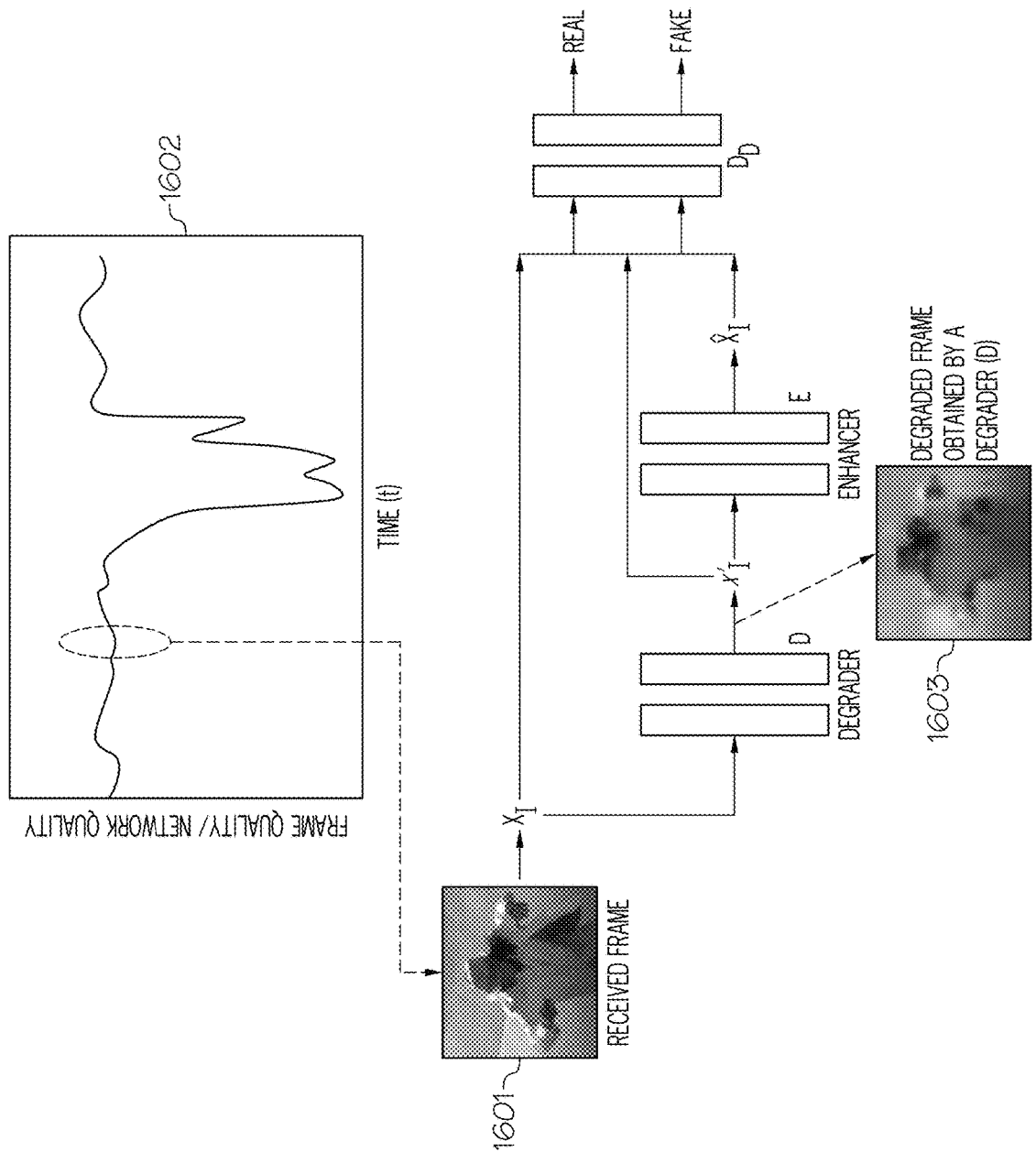
FIG. 16 illustrates training the enhancer (E) by degrading high-quality frames in accordance with an embodiment of the present invention.

In one embodiment, in order to train the enhancer (E), the high-quality frames are degraded as shown in FIG. 16.

FIG. 16 illustrates training the enhancer (E) by degrading high-quality frames in accordance with an embodiment of the present invention.

Referring to FIG. 16, the received frame 1601 is a high-quality frame as indicated in the graph 1602 of frame quality/network quality versus time. Such high-quality frame is degraded (see element 1603) which is obtained by a degrader (D).

In one embodiment, the purpose of the degrader-enhancer pair is to prepare future frames having poor quality.

In one embodiment, the degradation performed by the degrader (D) can be chosen according to network characteristics. For example, the quality of the high-quality frames can be degraded by degrader (D) performing one or more of the following functions: blurring, Gaussian noise, fixed-pattern noise, image distortion, and deep-learning based noise generator.

In one embodiment, the deep-learning based noise generator (D) can be trained by pilot video samples to measure the statistical characteristics of certain network channels. In one embodiment, the pilot video samples are preliminarily shared by both the transmitter and the receiver.

Returning to FIG. 15, in conjunction with FIGS. 1-5 and 16, in step 1504, system 100 trains enhancer (E) to improve the quality of the video frames using the degraded first set of video frames using a machine learning system (e.g., generative adversarial network). Such training using a machine learning system is performed in a similar manner as discussed above in connection with step 206. The enhancer (E) is trained to improve the quality of the frames when the frames are received when the network quality is poor (e.g., second set of video frames) using a machine learning system.

In step 1505, system 100 applies the enhancer (E) to the second set of video frames to improve the quality of the second set of video frames.

Figure 17:
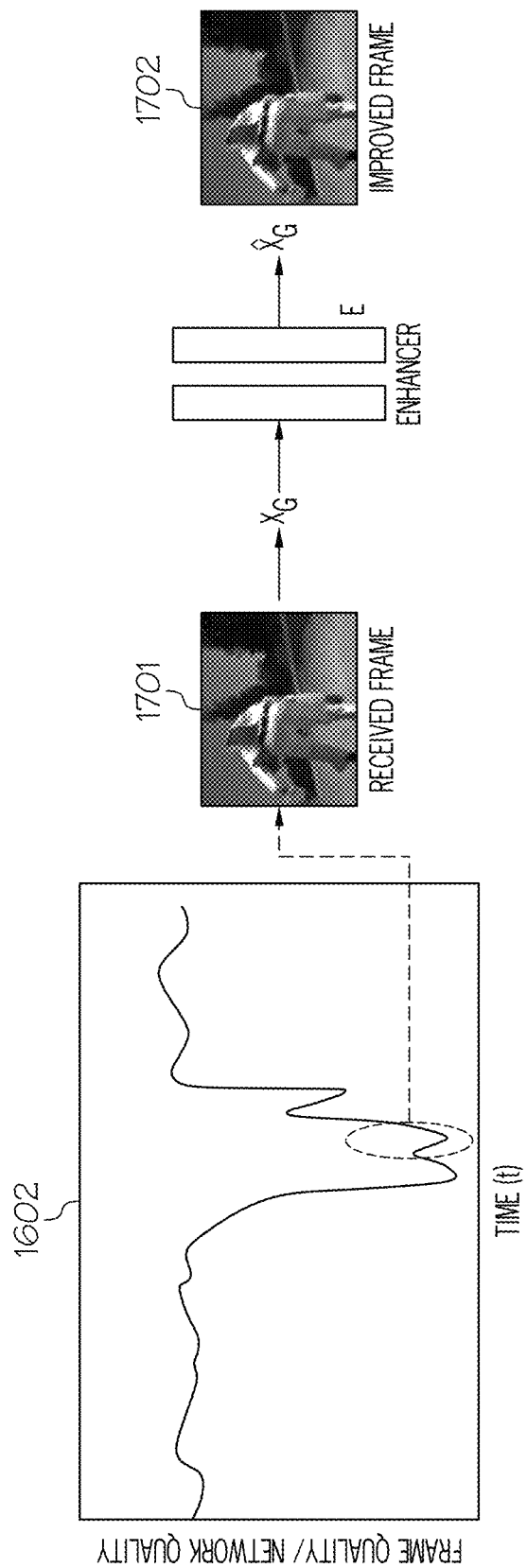
FIG. 17 illustrates improving a received video frame of poor quality using the trained enhancer (E) in accordance with an embodiment of the present invention.

In one embodiment, the trained enhancer (E) is applied to improve the quality of the frames when the received video frames are of poor quality as shown in FIG. 17.

FIG. 17 illustrates improving a received video frame of poor quality using the trained enhancer (E) in accordance with an embodiment of the present invention.

Referring to FIG. 17, the received frame 1701 is a poor-quality frame as indicated in the graph 1602 of frame quality/network quality versus time. By applying enhancer (E), the quality of the video frame is much improved as shown in element 1702.

As a result of the present invention, the quality of the streaming video is improved using the degrader (D) and enhancer (E) pair discussed above. Furthermore, in one embodiment, the degrader (D) and enhancer (E) pair can be pre-trained with multiple original frames and corresponding degraded frames from different video sets.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for improving quality of video frame parts, the method comprising:
   determining whether a communication network quality exceeds a threshold value by utilizing one or more quality of service parameters;
   receiving a first set of video frames when said communication network quality exceeds said threshold value;
   receiving a second set of video frames when said communication network quality does not exceed said threshold value;
   degrading said first set of video frames by a degrader, wherein said degradation performed by said degrader is based on network characteristics;
   training an enhancer to improve quality of video frames using said degraded first set of video frames using a machine learning system; and
   applying said enhancer to said second set of video frames to improve a quality of said second set of video frames.

2. The method as recited in claim 1, wherein said degrading of said first set of video frames comprises degrading a quality of said first set of video frames by performing one or more of the following functions: blurring, Gaussian noise, fixed-pattern noise, image distortion, and deep-learning based noise generator.

3. The method as recited in claim 1, wherein said degrader performs a deep-learning based noise generator function, wherein said degrader is trained by pilot video samples to measure statistical characteristics of certain network channels, wherein said pilot video samples are preliminarily shared by both a transmitter and a receiver.

4. The method as recited in claim 1, wherein said one or more quality of service parameters measure jitter, packet loss, bit rate, throughput, and transmission delay.

5. The method as recited in claim 1, wherein said first set of video frames are used as training samples by said machine learning system to train said degrader and said enhancer as a pair.

6. The method as recited in claim 1, wherein said machine learning system comprises a generative adversarial network.

7. The method as recited in claim 1 further comprising:
   pre-training said degrader and said enhancer as a pair with multiple original frames and corresponding degraded frames from different video sets.

8. A computer program product for improving quality of video frame parts, the computer program product comprising one or more computer readable storage mediums having program code embodied therewith, the program code comprising the programming instructions for:
   determining whether a communication network quality exceeds a threshold value by utilizing one or more quality of service parameters;
   receiving a first set of video frames when said communication network quality exceeds said threshold value;
   receiving a second set of video frames when said communication network quality does not exceed said threshold value;
   degrading said first set of video frames by a degrader, wherein said degradation performed by said degrader is based on network characteristics;
   training an enhancer to improve quality of video frames using said degraded first set of video frames using a machine learning system; and
   applying said enhancer to said second set of video frames to improve a quality of said second set of video frames.

9. The computer program product as recited in claim 8, wherein said degrading of said first set of video frames comprises degrading a quality of said first set of video frames by performing one or more of the following functions: blurring, Gaussian noise, fixed-pattern noise, image distortion, and deep-learning based noise generator.

10. The computer program product as recited in claim 8, wherein said degrader performs a deep-learning based noise generator function, wherein said degrader is trained by pilot video samples to measure statistical characteristics of certain network channels, wherein said pilot video samples are preliminarily shared by both a transmitter and a receiver.

11. The computer program product as recited in claim 8, wherein said one or more quality of service parameters measure jitter, packet loss, bit rate, throughput, and transmission delay.

12. The computer program product as recited in claim 8, wherein said first set of video frames are used as training samples by said machine learning system to train said degrader and said enhancer as a pair.

13. The computer program product as recited in claim 8, wherein said machine learning system comprises a generative adversarial network.

14. The computer program product as recited in claim 8, wherein the program code further comprises the programming instructions for:
pre-training said degrader and said enhancer as a pair with multiple original frames and corresponding degraded frames from different video sets.

15. A system, comprising:
a memory for storing a computer program for improving quality of video frame parts; and
a processor connected to the memory, wherein the processor is configured to execute the program instructions of the computer program comprising:
determining whether a communication network quality exceeds a threshold value by utilizing one or more quality of service parameters;
receiving a first set of video frames when said communication network quality exceeds said threshold value;
receiving a second set of video frames when said communication network quality does not exceed said threshold value;
degrading said first set of video frames by a degrader, wherein said degradation performed by said degrader is based on network characteristics;
training an enhancer to improve quality of video frames using said degraded first set of video frames using a machine learning system; and
applying said enhancer to said second set of video frames to improve a quality of said second set of video frames.

16. The system as recited in claim 15, wherein said degrading of said first set of video frames comprises degrading a quality of said first set of video frames by performing one or more of the following functions: blurring, Gaussian noise, fixed-pattern noise, image distortion, and deep-learning based noise generator.

17. The system as recited in claim 15, wherein said degrader performs a deep-learning based noise generator function, wherein said degrader is trained by pilot video samples to measure statistical characteristics of certain network channels, wherein said pilot video samples are preliminarily shared by both a transmitter and a receiver.

18. The system as recited in claim 15, wherein said one or more quality of service parameters measure jitter, packet loss, bit rate, throughput, and transmission delay.

19. The system as recited in claim 15, wherein said first set of video frames are used as training samples by said machine learning system to train said degrader and said enhancer as a pair.

20. The system as recited in claim 15, wherein the program instructions of the computer program further comprise:
pre-training said degrader and said enhancer as a pair with multiple original frames and corresponding degraded frames from different video sets.

\* \* \* \* \*

UNITED STATES PATENT AND TRADEMARK OFFICE
CERTIFICATE OF CORRECTION

| | | |
|---|---|---|
| PATENT NO. | : 12,058,340 B2 | Page 1 of 1 |
| APPLICATION NO. | : 17/840126 | |
| DATED | : August 6, 2024 | |
| INVENTOR(S) | : Bovik et al. | |

It is certified that error appears in the above-identified patent and that said Letters Patent is hereby corrected as shown below:

In the Specification

Column 11, Line 19, delete "by" and insert --by $X_1$--.

Signed and Sealed this
Second Day of December, 2025

John A. Squires
*Director of the United States Patent and Trademark Office*